United States Patent [19]
Hasegawa et al.

[11] Patent Number: 5,548,514
[45] Date of Patent: Aug. 20, 1996

[54] AIR/FUEL RATIO ESTIMATION SYSTEM FOR INTERNAL COMBUSTION ENGINE

[75] Inventors: Yusuke Hasegawa; Isao Komoriya; Eisuke Kimura; Shusuke Akazaki; Yoichi Nishimura, all of Wako, Japan

[73] Assignee: Honda Giken Kogyo Kabushiki Kaisha, Tokyo, Japan

[21] Appl. No.: 383,204

[22] Filed: Feb. 3, 1995

[30] Foreign Application Priority Data

Feb. 4, 1994 [JP] Japan .................................. 6-033202

[51] Int. Cl.$^6$ ............................ G06G 7/70; F02D 41/00; F01N 3/00
[52] U.S. Cl. ................. 364/431.05; 364/431.03; 364/431.04; 60/276; 60/277; 123/673; 123/479
[58] Field of Search .................... 364/431.03–431.07; 60/275, 276, 277, 285; 123/703, 673, 419, 436, 306, 672, 674

[56] References Cited

U.S. PATENT DOCUMENTS

| | | | |
|---|---|---|---|
| 4,915,079 | 4/1990 | Holmes ..................................... | 123/479 |
| 4,962,741 | 10/1990 | Cook et al. .............................. | 123/673 |
| 5,073,113 | 12/1991 | Matsuoka ................................ | 60/276 |
| 5,158,063 | 10/1992 | Hosoda et al. .......................... | 60/277 |
| 5,363,648 | 11/1994 | Akazaki et al. .......................... | 60/276 |

FOREIGN PATENT DOCUMENTS

| | | |
|---|---|---|
| 59-101562 | 6/1984 | Japan . |
| 2-275043 | 11/1990 | Japan . |
| 4-369471 | 12/1992 | Japan . |
| 5-180059 | 7/1993 | Japan . |
| 7-83094 | 3/1995 | Japan . |

*Primary Examiner*—Kevin J. Teska
*Assistant Examiner*—Jacques H. Louis-Jacques
*Attorney, Agent, or Firm*—Nikaido, Marmelstein, Murray & Oram LLP

[57] ABSTRACT

A system for estimating air/fuel ratios in the individual cylinders of a multicylinder internal combustion engine from an output of an air/fuel ratio sensor installed at an exhaust system of the engine. In the system, the exhaust system behavior is derived by a model in which X(k) is observed from a state equation and an output equation in which an input U(k) indicates air/fuel ratios in the individual cylinder and an output Y(k) indicates of the estimated air/fuel ratio as $$X(k+1)=AX(k)+BU(k)$$

$$Y(k)=CX(k)+DU(k)$$

where A, B, C and D are coefficients. And an observer is expressed by an equation using the output Y(k) as an input and the air/fuel ratios in the individual cylinders is estimated from the state variable $\hat{X}$. In the system, the coefficient C is set to zero for a cylinder other than most recent m ($2 \leq m < n$) cylinders. Alternatively, a plurality of the observer matrices are prepared in advance and calculated at the same time. Depending on the engine operating condition or a valve timing switched between a plurality of characteristics one among the calculation results is selected.

30 Claims, 19 Drawing Sheets

AIR/FUEL RATIO ESTIMATION SYSTEM FOR INTERNAL COMBUSTION ENGINE

BACKGROUND OF THE INVENTION

Field of the Invention

This invention relates to a system for estimating air/fuel ratio of an internal combustion engine, more specifically to a system for estimating air/fuel ratios in the individual cylinders of a multicylinder internal combustion engine.

Description of the Prior Art

It is a common practice to detect air/fuel ratio in an internal combustion engine by installing an air/fuel ratio sensor in the exhaust system. A system of this type is taught by Japanese Laid-open Patent Application No. Sho 59(1984)-101,562, for example. On the other hand, the assignee's Japanese Laid-open Patent Application No. Hei 5(1993)-180,059 discloses a system in which a model describing the behavior of the exhaust system is designed, the output of a single air/fuel ratio sensor installed at the exhaust system confluence point is inputted to the model, and the air/fuel ratios in the cylinders are estimated via an observer. The air/fuel ratio sensor used in this case is of the wide-range type (not an $O_2$ sensor whose output inverts at the stoichiometric air/fuel ratio) but of the type whose output remains proportional to the oxygen concentration of the exhaust gas from before to after the stoichiometric air/fuel ratio.

The assignee's former prior art system is able to estimate the air/fuel ratios in the individual cylinders with high accuracy. However, in actual control situations, where it is necessary to change the computation parameters in response to frequent changes in the engine operating condition, they are often unable to secure sufficient time for the computations.

One object of the present invention therefore is to overcome the problems of the assignee's former prior art technology by providing a system for estimating the air/fuel ratios in the individual cylinders of a multicylinder internal combustion engine in which the accuracy with which the air/fuel ratios in the individual cylinders are estimated by an observer is increased by simplify the computations.

Moreover, the coefficients used for matrix calculation in the observer have to be changed depending on the engine operating condition.

A second object of the invention therefore is to provide a system for estimating the air/fuel ratios in the individual cylinders of a multicylinder internal combustion engine in which the observer estimation accuracy is enhanced by optimizing the observer matrix calculations in response to changes in the coefficients used in the observer matrix calculations which vary with the engine operating condition.

Moreover, as taught by Japanese Laid-open Patent Application No. Hei 2(1990)-275,043, for example, recent years have seen the development of variable valve timing mechanisms which vary the valve timing of an internal combustion engine in accordance with the engine operating condition. If this kind of variable valve timing mechanism also varies the exhaust timing, the change in exhaust timing can be expected to affect the air/fuel ratio behavior at the confluence point.

A third object of the invention therefore is to provide a system for estimating the air/fuel ratios in the individual cylinders of a multicylinder internal combustion engine in which the observer estimation accuracy is enhanced by also optimizing the observer matrix calculations in an internal combustion engine equipped with a variable valve timing mechanism.

Furthermore, the appropriate sampling timing of the air/fuel ratio sensor will vary depending on the valve timing when the engine is equipped with a variable valve timing mechanism, which affects the observer estimation accuracy.

A fourth object of the invention therefore is to provide a system for estimating the air/fuel ratios in the individual cylinders of a multicylinder internal combustion engine in which the observer estimation accuracy is enhanced in an internal combustion engine equipped with a variable valve timing mechanism by improving the sampling precision of the air/fuel ratio sensor.

SUMMARY OF THE INVENTION

For realizing these objects, the present invention provides a system for estimating air/fuel ratios in individual cylinders of a multicylinder internal combustion engine from an output of an air/fuel ratio sensor installed at an exhaust system of the engine, including exhaust system behavior deriving means for deriving a behavior of the exhaust system in which $X(k)$ is observed from a state equation and an output equation in which an input $U(k)$ indicates air/fuel ratios in the individual cylinder and an output $Y(k)$ indicates the estimated air/fuel ratio as $$X(k+1)=AX(k)+BU(k)$$

$$Y(k)=CX(k)+DU(k)$$

where A, B, C and D are coefficients. The system includes assuming means for assuming the input $U(k)$ as predetermined values to establish an observer expressed by an equation using the output $Y(k)$ as an input in which a state variable X indicates the air/fuel ratios in the individual cylinders as $$\hat{X}(k+1)=[A-KC]\hat{X}(k)+KY(k)$$

where K is a gain matrix, and estimating means for estimating the air/fuel ratios in the individual cylinders from the state variable $\hat{X}$. The improvement of the system comprises zero setting means for setting the coefficient C to zero for a cylinder other than most recent m ($2 \leq m < n$) cylinders when a number of cylinders to be estimated their air/fuel ratios is $3 \leq n$.

BRIEF EXPLANATION OF THE DRAWINGS

These and other objects and advantages of the invention will be more apparent from the following description and drawings, in which.

DETAILED DESCRIPTION OF THE PREFERRED EMBODIMENTS

Embodiments of the invention will now be explained with reference to the drawings.

Figure 1:
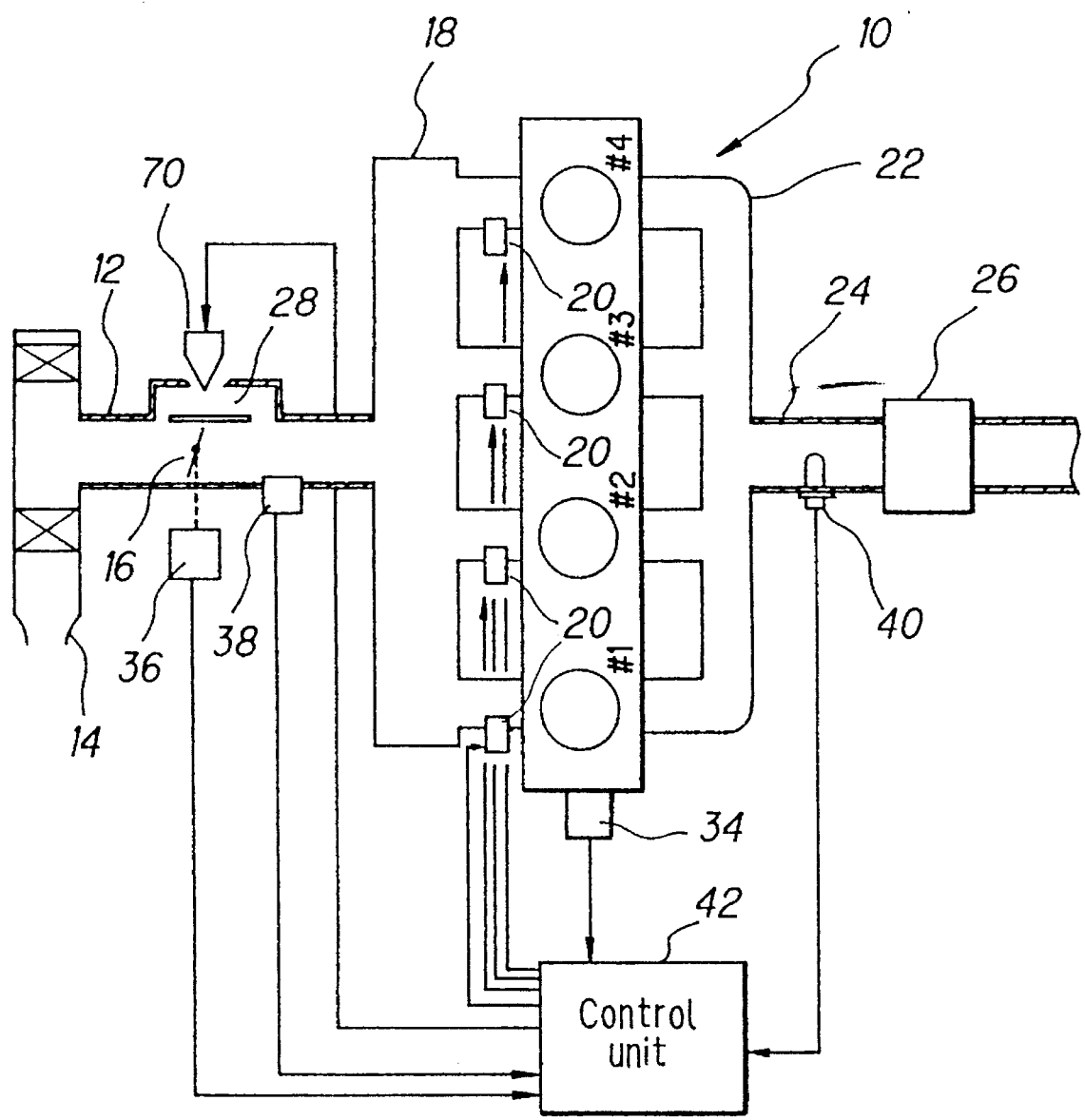
FIG. 1 is an overall schematic view of the air/fuel ratio estimation system of an internal combustion engine according to the present invention.

FIG. 1 is an overall schematic view of an air/fuel ratio estimation system according to the invention. Reference numeral 10 in this figure designates a four-cylinder internal combustion engine. Air drawn in through an air cleaner 14 mounted on the far end of an air intake path 12 is supplied to the first to fourth cylinders through an intake manifold 18 while the flow thereof is adjusted by a throttle valve 16. A fuel injector 20 for injecting fuel is installed in the vicinity of the intake valve (not shown) of each cylinder. The injected fuel mixes with the intake air to form an air-fuel mixture that is ignited in the associated cylinder by a spark plug (not shown). The resulting combustion of the air-fuel mixture drives down a piston (not shown). The exhaust gas produced by the combustion is discharged through an exhaust valve (not shown) into an exhaust manifold 22, from where it passes through an exhaust pipe 24 to a three-way catalytic converter 26 where it is removed of noxious components before being discharged to the exterior. In addition, the air intake path 12 is bypassed by a bypass 28 provided therein in the vicinity of the throttle valve 16.

A crank angle sensor 34 for detecting the piston crank angles is provided in the distributor (not shown) of the internal combustion engine 10, a throttle position sensor 36 is provided for detecting the degree of opening of the throttle valve 16, and a manifold absolute pressure sensor 38 is provided for detecting the pressure of the intake air downstream of the throttle valve 16 as an absolute pressure. A wide-range air/fuel ratio sensor 40 constituted as an oxygen concentration detector is provided in the exhaust system at a point between the exhaust manifold 22 and the three-way catalytic converter 26. The wide-range air/fuel ratio sensor 40 produces an output proportional to the oxygen concentration of the exhaust gas. The outputs of the sensors 34 etc. are sent to a control unit 42.

Figure 2:
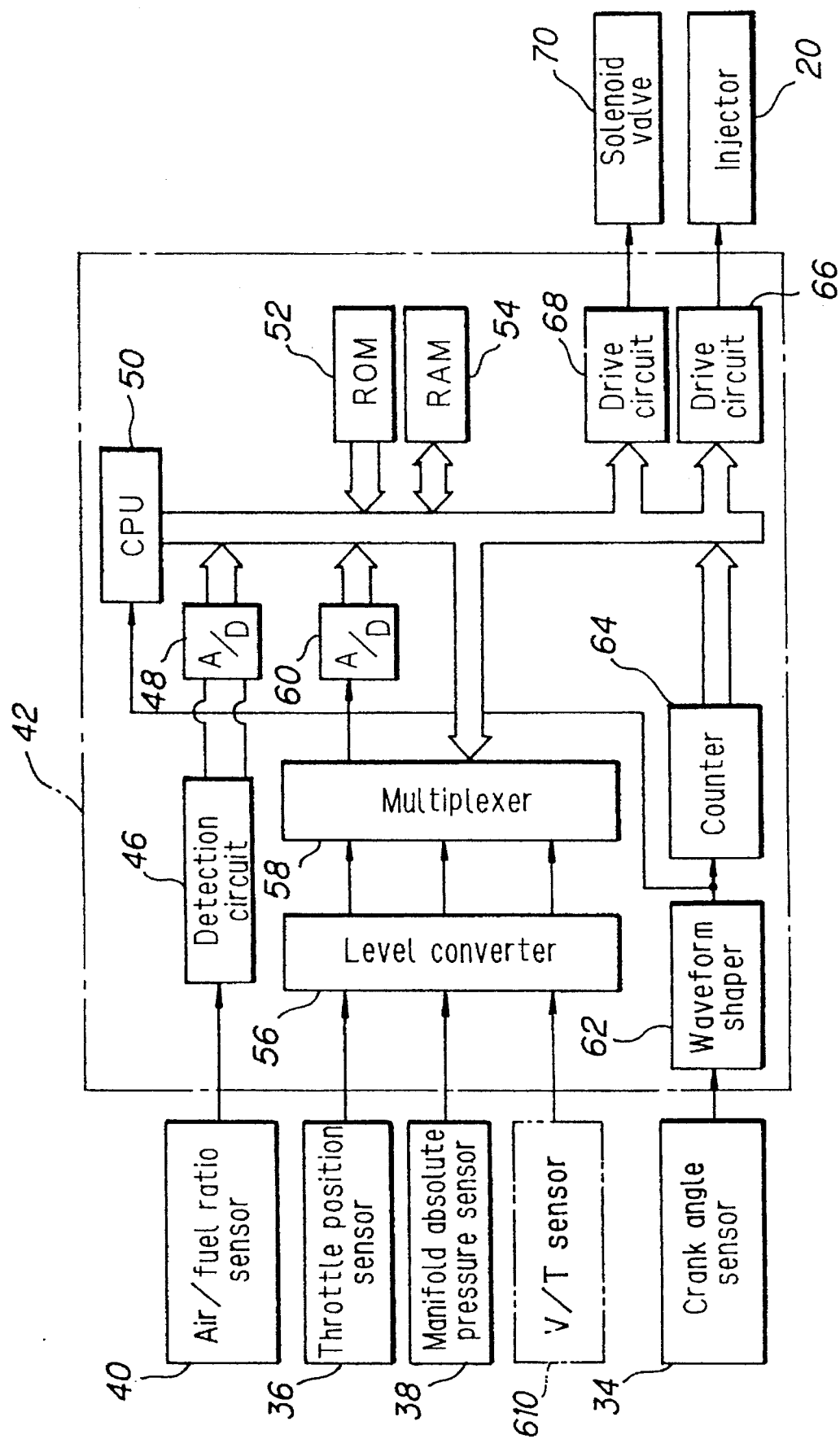
FIG. 2 is a block diagram which shows the details of a control unit illustrated in FIG. 1.

Details of the control unit 42 are shown in the block diagram of FIG. 2. The output of the wide-range air/fuel ratio sensor 40 is received by a detection circuit 46 in the control unit 42, where it is subjected to appropriate linearization processing to obtain an air/fuel ratio which varies linearly with the oxygen concentration of the exhaust gas over a broad range centered on the stoichiometric air/fuel ratio and extending from the lean side to the rich side. As this air/fuel ratio is explained in detail in the assignee's earlier Japanese Laid-open Patent Application No. Hei 4(1992)-369471, it will not be explained further here. Hereinafter in this explanation, the air/fuel ratio sensor will be referred to as "LAF" sensor (linear A/F sensor). The output of the detection circuit 46 is forwarded through an A/D (analog/digital) converter 48 to a microcomputer comprising a CPU (central processing unit) 50, a ROM (read-only memory) 52 and a RAM (random access memory) 54 and is stored in the RAM 54.

Similarly, the analogue outputs of the throttle position sensor 36 etc. are inputted to the microcomputer through a level converter 56, a multiplexer 58 and a second A/D converter 60, while the digital output of the crank angle sensor 34 is shaped by a waveform shaper 62 and has its output value counted by a counter 64, the result of the count being inputted to the microcomputer. In accordance with commands stored in the ROM 52, the CPU 50 of the microcomputer uses the detected values to compute a control input, drives the fuel injectors 20 of the respective cylinders via a drive circuit 66 and drives a solenoid valve 70 via a second drive circuit 68 for controlling the amount of secondary air passing through the bypass 28. And the CPU 50 estimates the air/fuel ratios in a manner explained later.

To make the invention easier to understand, a brief explanation will first be given regarding the previously proposed model describing exhaust system behavior.

Figure 3:
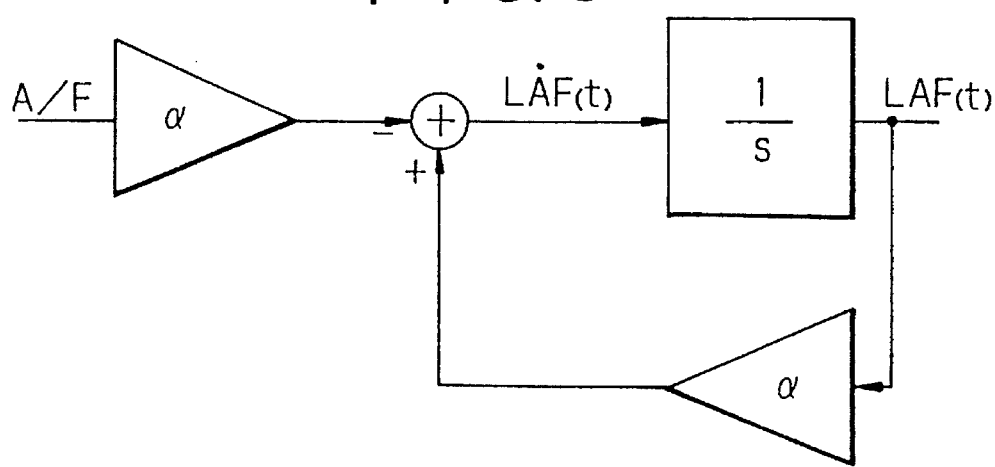
FIG. 3 is a block diagram showing a model which describes the behavior of detection of the air/fuel ratio referred to in the assignee's earlier application.

For high-accuracy separation and extraction of the air/fuel ratios of the individual cylinders from the output of a single LAF sensor it is necessary to first accurately ascertain the detection response delay (lag time) of the LAF sensor. The inventors therefore simulated this delay using a first-order lag time system as a model. For this they designed the model shown in FIG. 3. Here, if we define LAF: LAF sensor output and A/F: input air/fuel ratio, the state equation can be written as $$L\dot{A}F(t) = \alpha LAF(t) - \alpha A/F(t) \quad (1)$$

When this is discretized for period delta T, we get $$LAF(k+1) = \hat{\alpha} LAF(k) + (1-\hat{\alpha}) A/F(k) \quad (2)$$

Here, $\hat{\alpha}$ is the correction coefficient and is defined as:

$$\hat{\alpha} = 1 + \alpha \Delta T + (1/2!)\alpha^2 \Delta T^2 + (1/3!)\alpha^3 \Delta T^3 + (1/4!)\alpha^4 \Delta T^4$$

Figure 4:
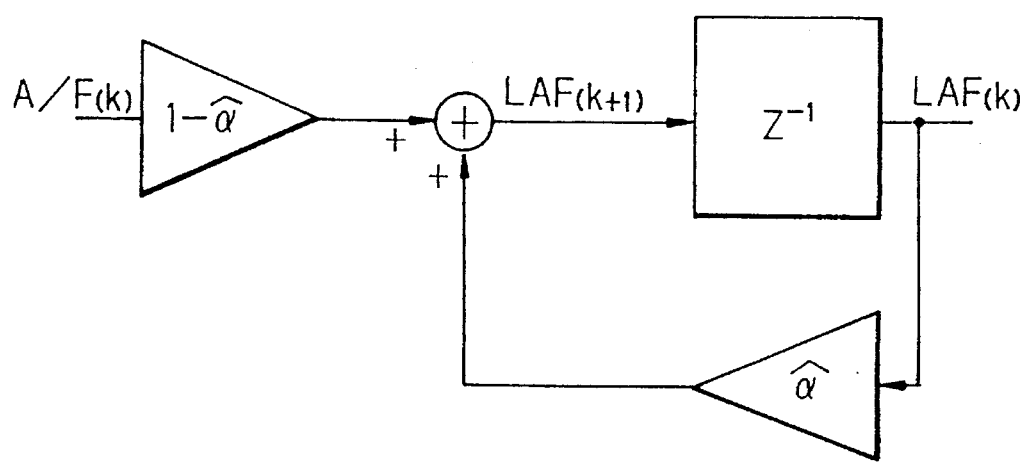
FIG. 4 is a block diagram which shows the model of FIG. 3 discretized in the discrete-time series for period delta T.

Equation 2 is represented as a block diagram in FIG. 4.

Therefore, Equation 2 can be used to obtain the actual air/fuel ratio from the sensor output. That is to say, since Equation 2 can be rewritten as Equation 3, the value at time k−1 can be calculated back from the value at time k as shown by Equation 4.

$$A/F(k) = \{LAF(k+1) - \hat{\alpha} LAF(k)\}/(1-\hat{\alpha}) \quad (3)$$

$$A/F(k-1) = \{LAF(k) - \hat{\alpha} LAF(k-1)\}/(1-\hat{\alpha}) \quad (4)$$

Figure 5:
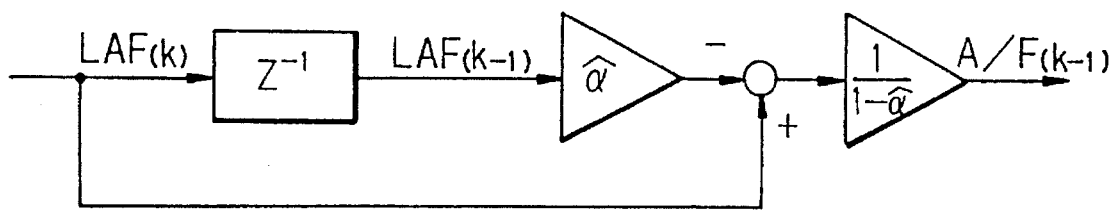
FIG. 5 is a block diagram which shows a real-time air/fuel ratio estimator based on the model of FIG. 4.

Specifically, use of the Z transformation to express Equation 2 as a transfer function gives Equation 5, and a real-time estimate of the air/fuel ratio input in the preceding cycle can be obtained by multiplying the sensor output LAF of the current cycle by the inverse transfer function. FIG. 5 is a block diagram of the real-time air/fuel ratio estimator.

$$t(z) = (1-\hat{\alpha})/(Z-\hat{\alpha}) \quad (5)$$

The method for separating and extracting the air/fuel ratios in the individual cylinders based on the actual air/fuel ratio obtained in the foregoing manner will now be explained. If the air/fuel ratio at the confluence point of the exhaust system is assumed to be an average weighted to reflect the time-based contribution of the air/fuel ratios in the individual cylinders, it becomes possible to express the air/fuel ratio at the confluence point at time k in the manner of Equation 6. (As F (fuel) was selected as the manipulated variable, the fuel/air ratio F/A is used here. For easier understanding, however, the air/fuel ratio will sometimes be used in this explanation. The term "air/fuel ratio" (or "fuel/air ratio") used herein is the actual value corrected for the response lag time calculated according to Equation 5.)

$$\begin{aligned}
[F/A](k) &= C_1[F/A\#_1] + C_2[F/A\#_3] + \\
&\quad C_3[F/A\#_4] + C_4[F/A\#_2] \\
[F/A](k+1) &= C_1[F/A\#_3] + C_2[F/A\#_4] + \\
&\quad C_3[F/A\#_2] + C_4[F/A\#_1] \\
[F/A](k+2) &= C_1[F/A\#_4] + C_2[F/A\#_2] + \\
&\quad C_3[F/A\#_1] + C_4[F/A\#_3]
\end{aligned} \quad (6)$$

$$\vdots$$

Figure 6:
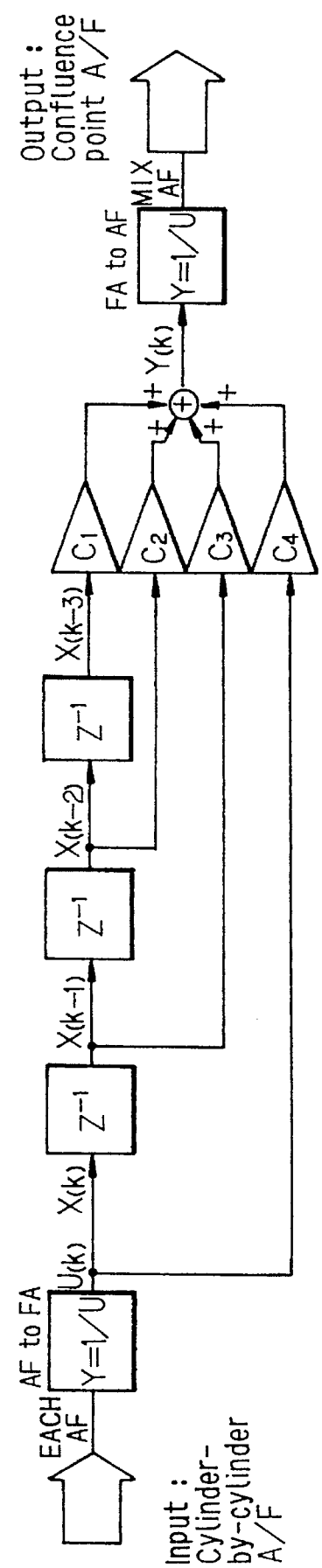
FIG. 6 is a block diagram showing a model which describes the behavior of the exhaust system of the engine referred to in the assignee's earlier application.

More specifically, the air/fuel ratio at the confluence point can be expressed as the sum of the products of the past firing histories of the respective cylinders and weighting coefficients C (for example, 40% for the cylinder that fired most recently, 30% for the one before that, and so on). This model can be represented as a block diagram as shown in FIG. 6. Its state equation can be written as $$\begin{bmatrix} x(k-2) \\ x(k-1) \\ x(k) \end{bmatrix} = \begin{bmatrix} 0 & 1 & 0 \\ 0 & 0 & 1 \\ 0 & 0 & 0 \end{bmatrix} \begin{bmatrix} x(k-3) \\ x(k-2) \\ x(k-1) \end{bmatrix} + \begin{bmatrix} 0 \\ 0 \\ 1 \end{bmatrix} u(k) \quad (7)$$

Further, if the air/fuel ratio at the confluence point is defined as y(k), the output equation can be written as $$y(k) = [c_1 \ c_2 \ c_3] \begin{bmatrix} x(k-3) \\ x(k-2) \\ x(k-1) \end{bmatrix} + c_4 u(k) \quad (8)$$

Here:

$c_1$:0.25379, $c_2$:0.10121, $c_3$:0.46111, $c_4$:0.18389

Since u(k) in this equation cannot be observed, even if an observer is designed from the equation, it will still not be possible to observe x(k). Thus, if one defines x(k+1)=x(k−3) on the assumption of a stable operating state in which there is no abrupt change in the air/fuel ratio from that 4 TDCs earlier (i.e., from that of the same cylinder), Equation 9 is obtained.

$$\begin{bmatrix} x(k-2) \\ x(k-1) \\ x(k) \\ x(k+1) \end{bmatrix} = \begin{bmatrix} 0 & 1 & 0 & 0 \\ 0 & 0 & 1 & 0 \\ 0 & 0 & 0 & 1 \\ 1 & 0 & 0 & 0 \end{bmatrix} \begin{bmatrix} x(k-3) \\ x(k-2) \\ x(k-1) \\ x(k) \end{bmatrix} \quad (9)$$

$$y(k) = [c_1 \ c_2 \ c_3 \ c_4] \begin{bmatrix} x(k-3) \\ x(k-2) \\ x(k-1) \\ x(k) \end{bmatrix}$$

Figure 7:
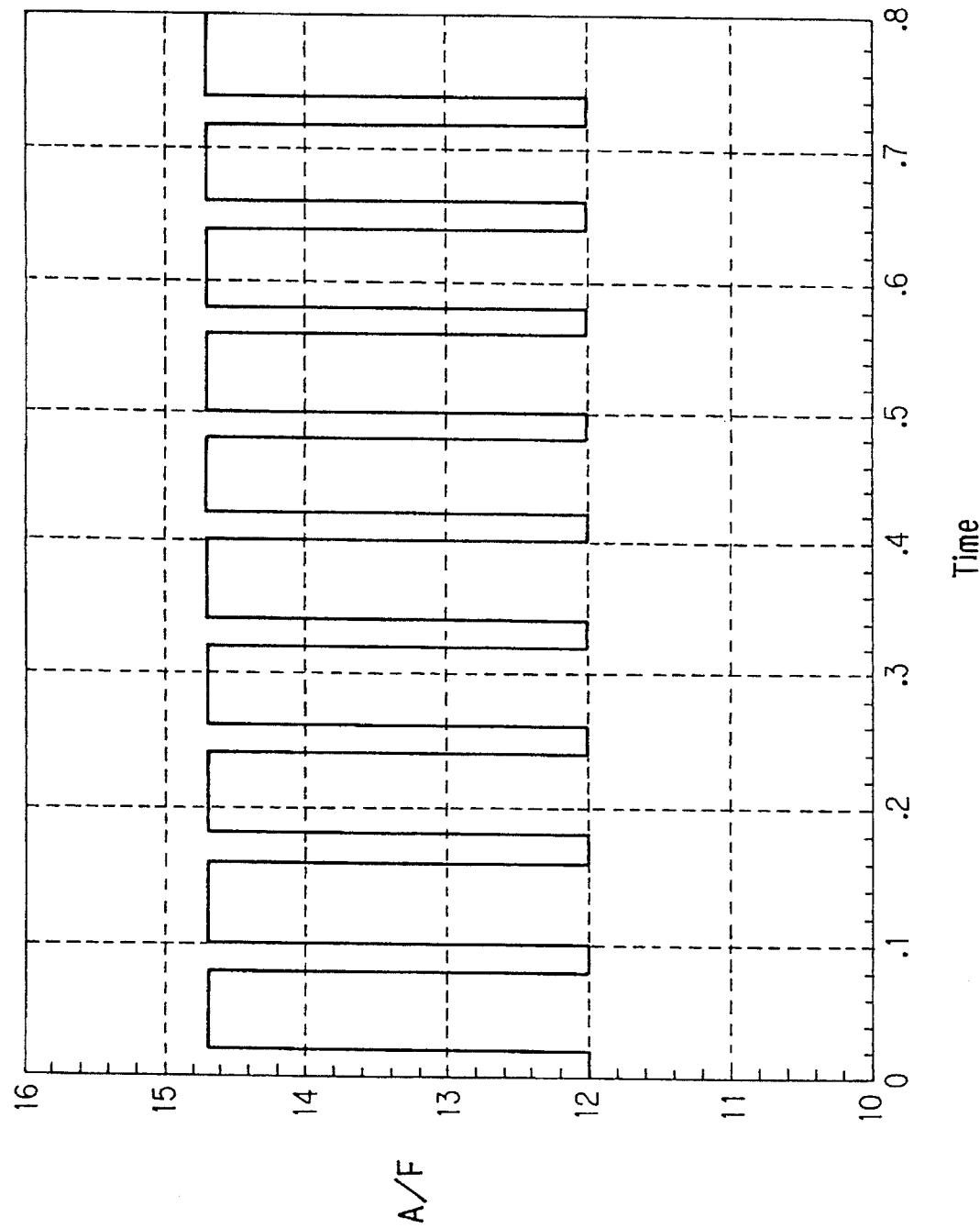
FIG. 7 is a graph of simulation where fuel is assumed to be supplied to three cylinders of a four-cylinder engine so as to obtain an air/fuel ratio of 14.7:1 and to one cylinder so as to obtain an air/fuel ratio of 12.0:1.
Figure 8:
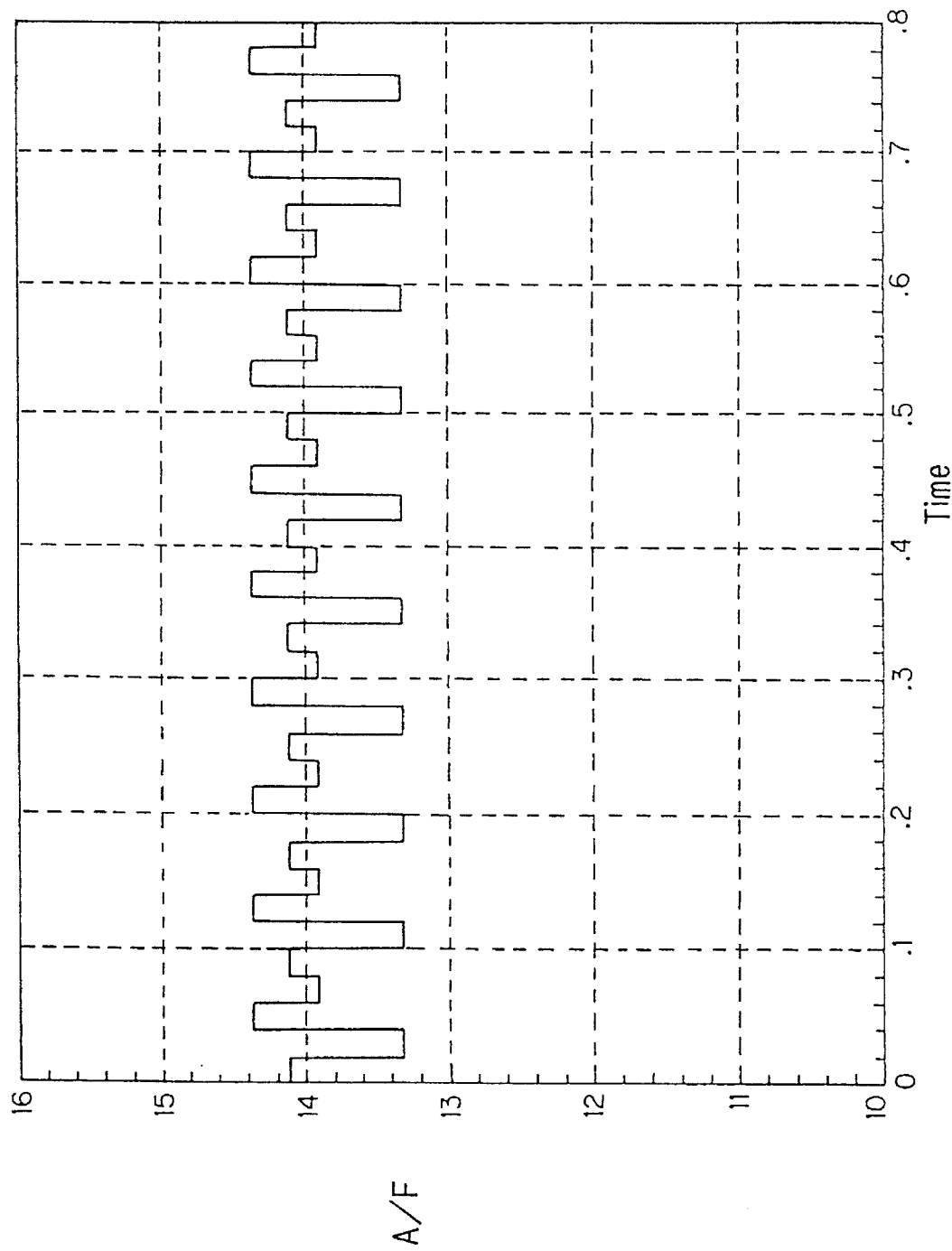
FIG. 8 is the result of the simulation which shows the output of the exhaust system model and the air/fuel ratio at a confluence point when the fuel is supplied in the manner illustrated in FIG. 7.
Figure 9:
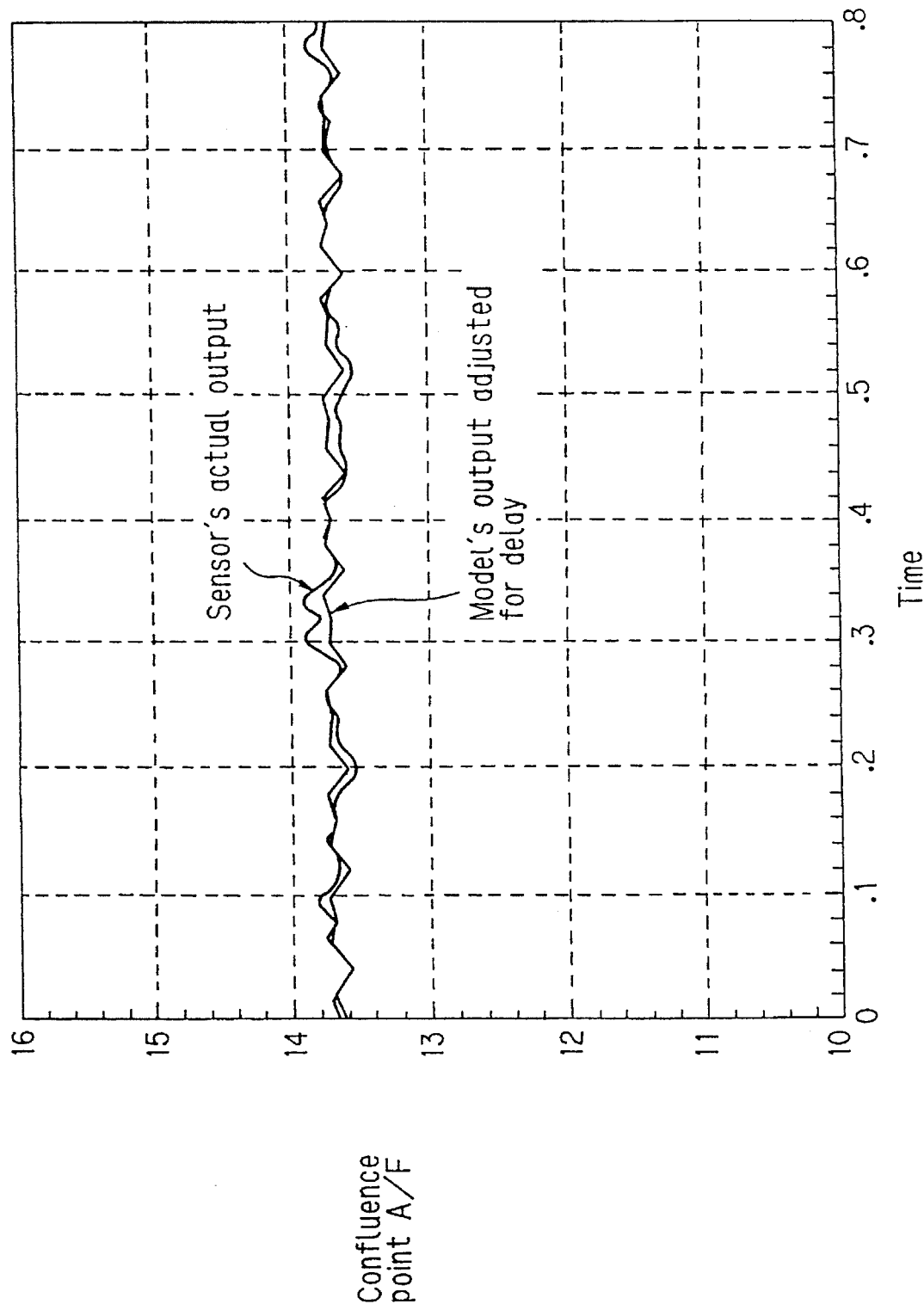
FIG. 9 is the result of the simulation which shows the output of the exhaust system model adjusted for sensor detection response delay (time lag) in contrast with the sensor's actual output.

The simulation results for the model obtained in the foregoing manner will now be given. FIG. 7 relates to the case where fuel is supplied to three cylinders of a four-cylinder internal combustion engine so as to obtain an air/fuel ratio of 14.7:1 and to one cylinder so as to obtain an air/fuel ratio of 12.0:1. FIG. 8 shows the air/fuel ratio at this time at the confluence point as obtained using the aforesaid model. While FIG. 8 shows that a stepped output is obtained, when the response delay (lag time) of the LAF sensor is taken into account, the sensor output becomes the smoothed wave designated "Model's output adjusted for delay" in FIG. 9. The curve marked "Sensor's actual output" is based on the actually observed output of the LAF sensor under the same conditions. The close agreement of the model results with this verifies the validity of the model as a model of the exhaust system of a multiple cylinder internal combustion engine.

Thus, the problem comes down to one of an ordinary Kalman filter in which x(k) is observed in the state equation, Equation 10, and the output equation. When the weighted matrices Q, R are determined as in Equation 11 and the Riccati's equation is solved, the gain matrix K becomes as shown in Equation 12.

$$\begin{cases} X(k+1) &= AX(k) + Bu(k) \\ y(k) &= CX(k) + Du(k) \end{cases} \quad (10)$$

Here:

$$A = \begin{bmatrix} 0100 \\ 0010 \\ 0001 \\ 1000 \end{bmatrix} \quad C = [c_1 c_2 c_3 c_4] \quad B = D = [0]$$

$$X(k) = \begin{bmatrix} x(k-3) \\ x(k-2) \\ x(k-1) \\ x(k) \end{bmatrix}$$

$$Q = \begin{bmatrix} 1000 \\ 0100 \\ 0010 \\ 0001 \end{bmatrix} \quad R = [1] \quad (11)$$

$$K = \begin{bmatrix} -0.3093 \\ 1.1918 \\ 0.3093 \\ 0.0803 \end{bmatrix} \quad (12)$$

Obtaining A–KC from this gives Equation 13.

$$A - KC = \begin{bmatrix} 0.0785 & 1.0313 & 0.1426 & 0.0569 \\ -0.3025 & -0.1206 & 0.4505 & -0.2192 \\ -0.0785 & -0.0313 & -0.1426 & 0.9431 \\ 0.9796 & -0.0081 & -0.0370 & -0.0148 \end{bmatrix} \quad (13)$$

Figure 10:
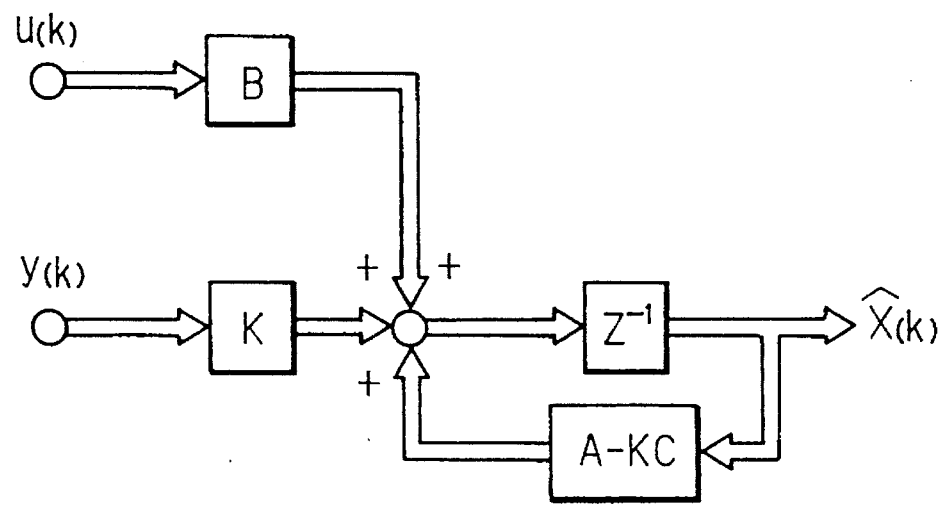
FIG. 10 is a block diagram which shows the configuration of an ordinary observer.
Figure 11:
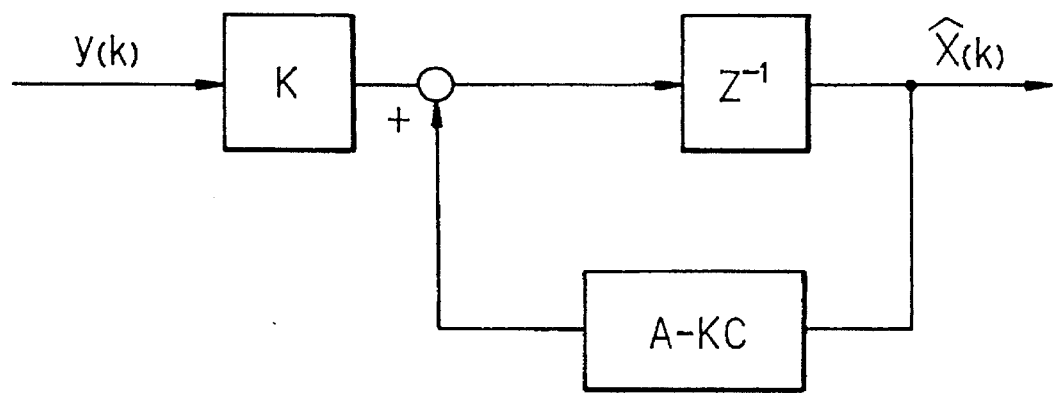
FIG. 11 is a block diagram which shows the configuration of the observer referred to in the assignee's earlier application.

FIG. 10 shows the configuration of an ordinary observer. Since there is no input u(k) in the present model, however, the configuration has only y(k) as an input, as shown in FIG. 11. This is expressed mathematically by Equation 14.

$$\begin{cases} \hat{X}(k+1) &= [A - KC]\hat{X}(k) + Ky(k) \\ \hat{x}(k) &= [0001]\hat{X}(k) \end{cases} \quad (14)$$

The system matrix of the observer whose input is y(k), namely of the Kalman filter, is $$S = \left[ \begin{array}{c|c} A - KC & K \\ \hline 0001 & 0 \end{array} \right] \quad (15)$$

In the present model, when the ratio of the member of the weighted matrix R in Riccati's equation to the member of Q is 1:1, the system matrix S of the Kalman filter is given as $$S = \begin{bmatrix} 0.0785 & 1.0313 & 0.1426 & 0.0569 & -0.3093 \\ -0.3025 & -0.1206 & 0.4505 & -0.2192 & 1.1918 \\ -0.0785 & -0.0313 & -0.1426 & 0.9431 & 0.3093 \\ 0.9796 & -0.0081 & -0.0370 & -0.0148 & 0.0803 \\ 0.0 & 0.0 & 0.0 & 1.0 & 0.0 \end{bmatrix} \quad (16)$$

Figure 12:
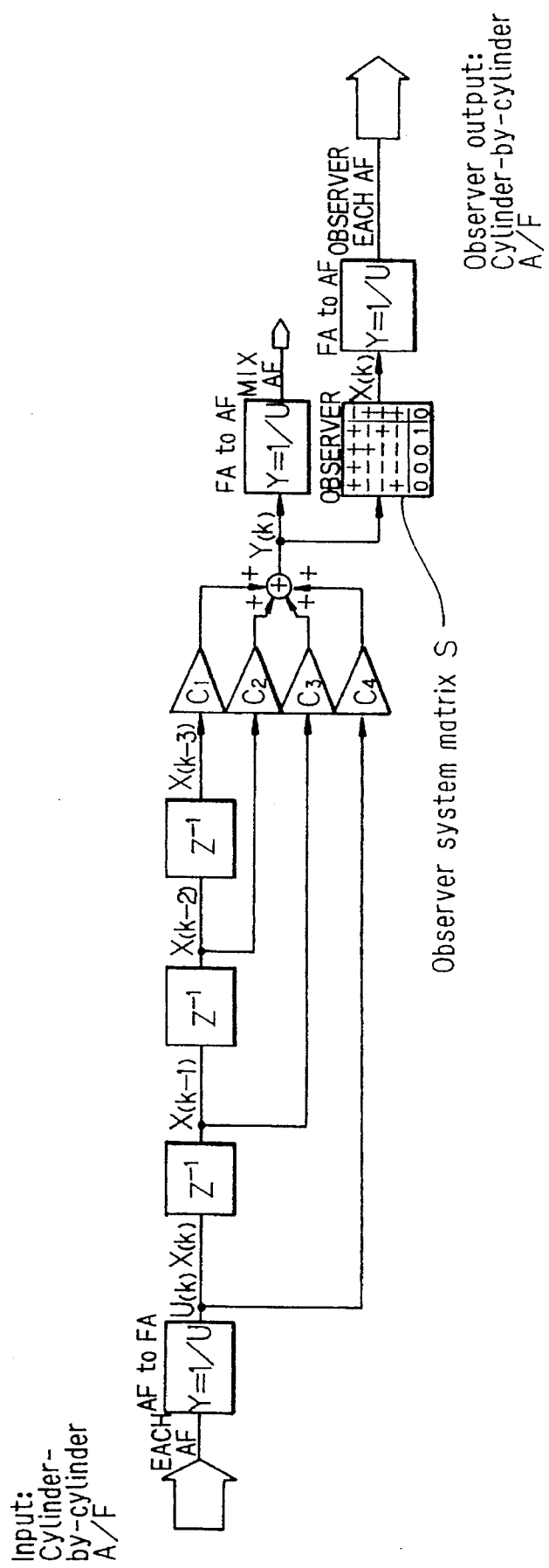
FIG. 12 is an explanatory block diagram which shows the configuration resulting from the combination of the model of FIG. 6 and the observer of FIG. 11.

FIG. 12 shows the configuration in which the aforesaid model and observer are combined. As this was described in detail in the assignee's earlier application, no further explanation will be given here.

Figure 13:
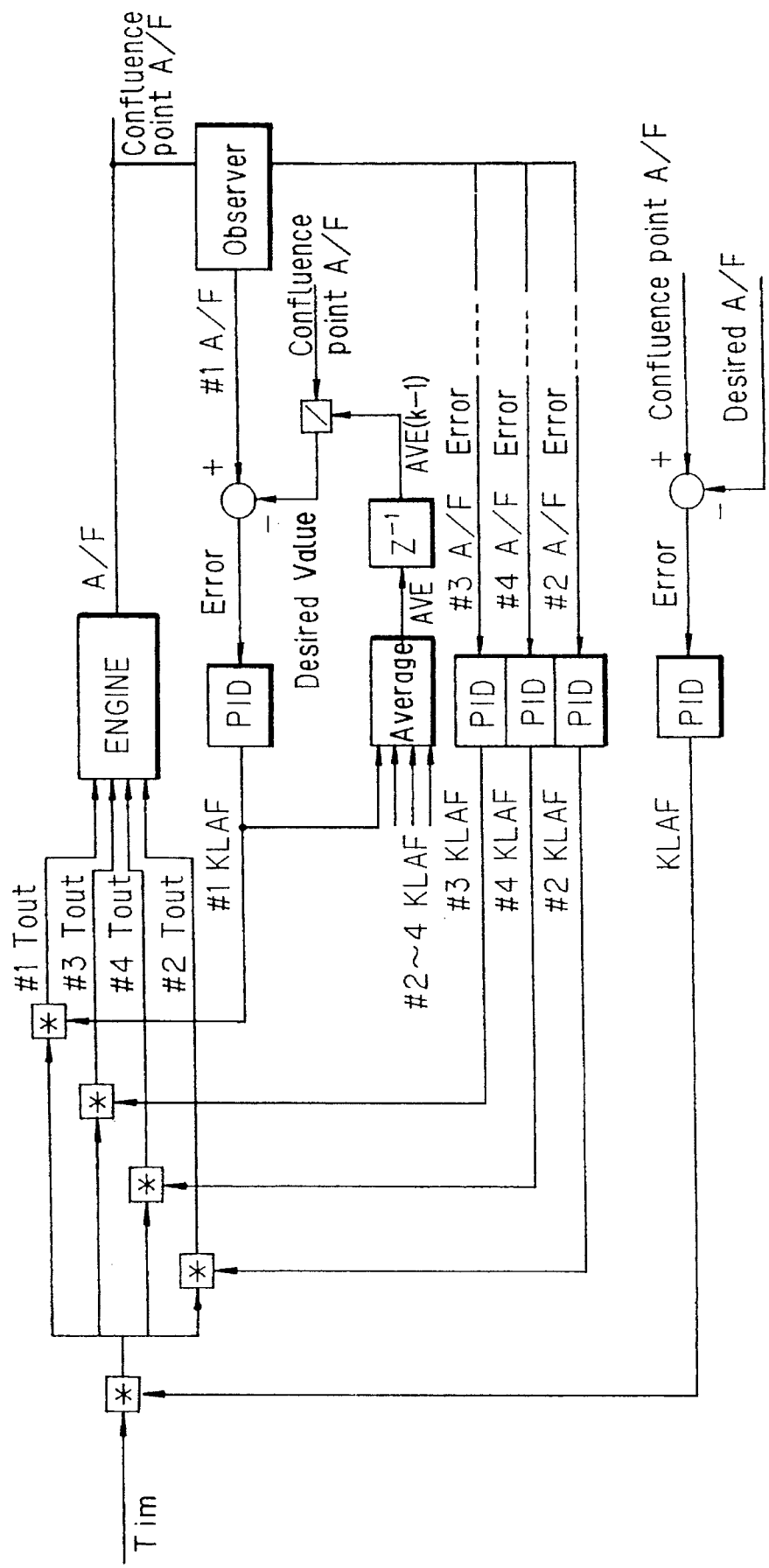
FIG. 13 is a block diagram which shows an air/fuel ratio feedback control in which the air/fuel ratios are controlled to a desired ratio through a PID controller.

Since the observer is able to estimate the cylinder-by-cylinder air/fuel ratio (each cylinder's air/fuel ratio) from the air/fuel ratio at the confluence point, the air/fuel ratios in the individual cylinders can, as shown in FIG. 13, be separately controlled by a PID controller or the like. Specifically, as shown in FIG. 13, only the variance between cylinders is absorbed by the cylinder-by-cylinder air/fuel ratio feedback loop using feedback factors #nKLAF and the error from the desired air/fuel ratio is absorbed by the confluence point air/fuel ratio feedback loop using a feedback factor KLAF. More specifically, as disclosed the desired value used in the confluence point air/fuel ratio feedback loop is the desired air/fuel ratio, while the cylinder-by-cylinder air/fuel ratio feedback loop arrives at its desired value by dividing the confluence point air/fuel ratio by the average value AVEk–1 in the preceding cycle of the average value AVE of the cylinder-by-cylinder feedback factors #nKLAF of all the cylinders.

With this arrangement, the cylinder-by-cylinder feedback factors #nKLAF operate to converge the cylinder-by-cylinder air/fuel ratios to the confluence point air/fuel ratio and, moreover, since the average value AVE of the cylinder-by-cylinder feedback factors tends to converge to 1.0, the factors do not diverge and the variance between cylinders is absorbed as a result. On the other hand, since the confluence point air/fuel ratio converges to the desired air/fuel ratio, the air/fuel ratios of all cylinders should therefore be converged to the desired air/fuel ratio. This is because when the cylinder-by-cylinder feedback factors #nKLAF are all set to 1.0 in the configuration of the cylinder-by-cylinder air/fuel ratio feedback loop, the operation continues until the feedback loop error disappears, i.e. until the denominator (the average value of the cylinder-by-cylinder feedback factors #nKLAF) becomes 1.0, indicating that the variance in air-fuel ratio between cylinders has been eliminated.

The fuel injection quantity #nTout (n: cylinder) here can be calculated in the term of an opening period of the fuel injector 20 as $$\#nTout = Tim \times KCMD \times KTOTAL \times \#nKLAF \times KLAF$$

where Tim: base value, KCMD: desired air/fuel ratio (expressed as equivalence ratio to be multiplied by the base value), KTOTAL: other correction factors. While an addition factor for battery correction and other addition terms might also be involved, they are omitted here. As this control is described in detail in the assignee's earlier Japanese Patent Application No. Hei 5(1993)-251,138, it will not be described further here.

The present invention will now be explained in light of the foregoing.

Figure 14:
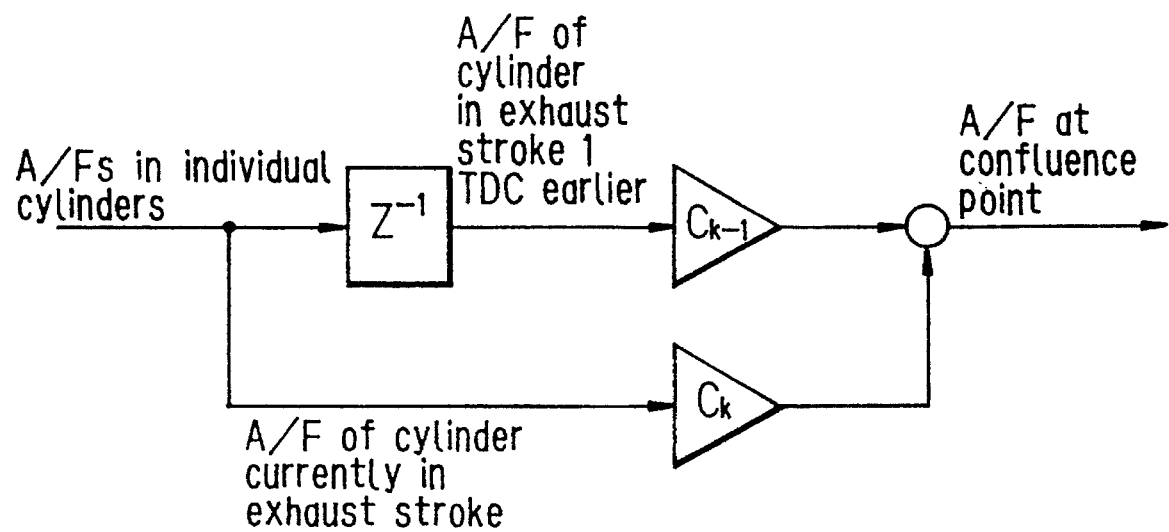
FIG. 14 is a block diagram, partially similar to FIG. 12, but showing a first embodiment of the air/fuel ratio estimation system according to the invention.

FIG. 14 shows a first embodiment of the invention. Where the weighting coefficients $C_1$, $C_2$, $C_3$, $C_4$ of the aforesaid weighted average are defined to be $C_k$ for the cylinder currently in the exhaust (combustion) stroke and $C_{k-1}$, $C_{k-2}$, $Ck_{k-3}$ for the cylinders in the exhaust (combustion) stroke one, two and three TDCs earlier, the weighting coefficients $Ck_{k-m}$ of the most recent firing cylinders (2≦m<n) times earlier are assigned with appropriate values and the others are set to zero. In other words, when the firing order of the cylinders is #1, #3, #4 and #2 and if the cylinder #1 is currently in the exhaust stroke, the weighting coefficients are predetermined only for the cylinders #1 and #2 and those for the other cylinders #3 and #4 are set to zero. More concretely, the weighting coefficients $C_{k-2}$, $C_{k-3}$ of the cylinders in the exhaust (combustion) stroke two and three times earlier are set to zero and, as illustrated, calculation is conducted only with regard to the two most recent (immediately preceding) cylinders (two most recent (immediately preceding) firing histories).

As was explained in the assignee's earlier application, although the weighting coefficients C indicating the behavior of the confluence point air/fuel ratio should be changed in response to the engine operating condition, this is not easy to accurately ascertain the weighting coefficients C. In view of the above, in a four-cylinder internal combustion engine, therefore, the weighting coefficients of the firing histories other than those of the two most recent (immediately preceding) firing histories in the order of the exhaust (combustion) strokes are set to zero. Since the total of the weighting coefficients is 1, the weighting coefficient is first calculated for one of the two most recent (immediately preceding) firing histories and the other is obtained by subtracting the calculated value from 1. (In the earlier application the weighting coefficients were first calculated for three cylinders and that of the fourth was similarly obtained by subtraction.) In other words, the configuration of FIG. 6 was modified to that of FIG. 14.

Good results were obtained when the validity of this configuration was checked by simulation. The estimation accuracy was in fact found to be higher than when three weighting coefficients C are calculated. This is because it is basically very difficult for a low performance on-board microcomputer to determine three weighting coefficients C and there is a high likelihood that an erroneous value will be used. Moreover, since the configuration in this embodiment need determine only a single coefficient, the interval between successive computations can be shortened, which also contributes to estimation accuracy. Whether and by how much the estimation accuracy can be improved also depends on the distance between the cylinder exhaust ports and the point at which the confluence point LAF sensor is installed. The embodiment configuration achieves a substantial improvement in estimation accuracy when this distance is relatively short.

It should be noted here that the dimension of the observer has to be an integer multiple of the number of cylinders whose air/fuel ratios are to be estimated and the integer is preferably 1. The dimension of the observer in this embodiment is 4.

Figure 15:
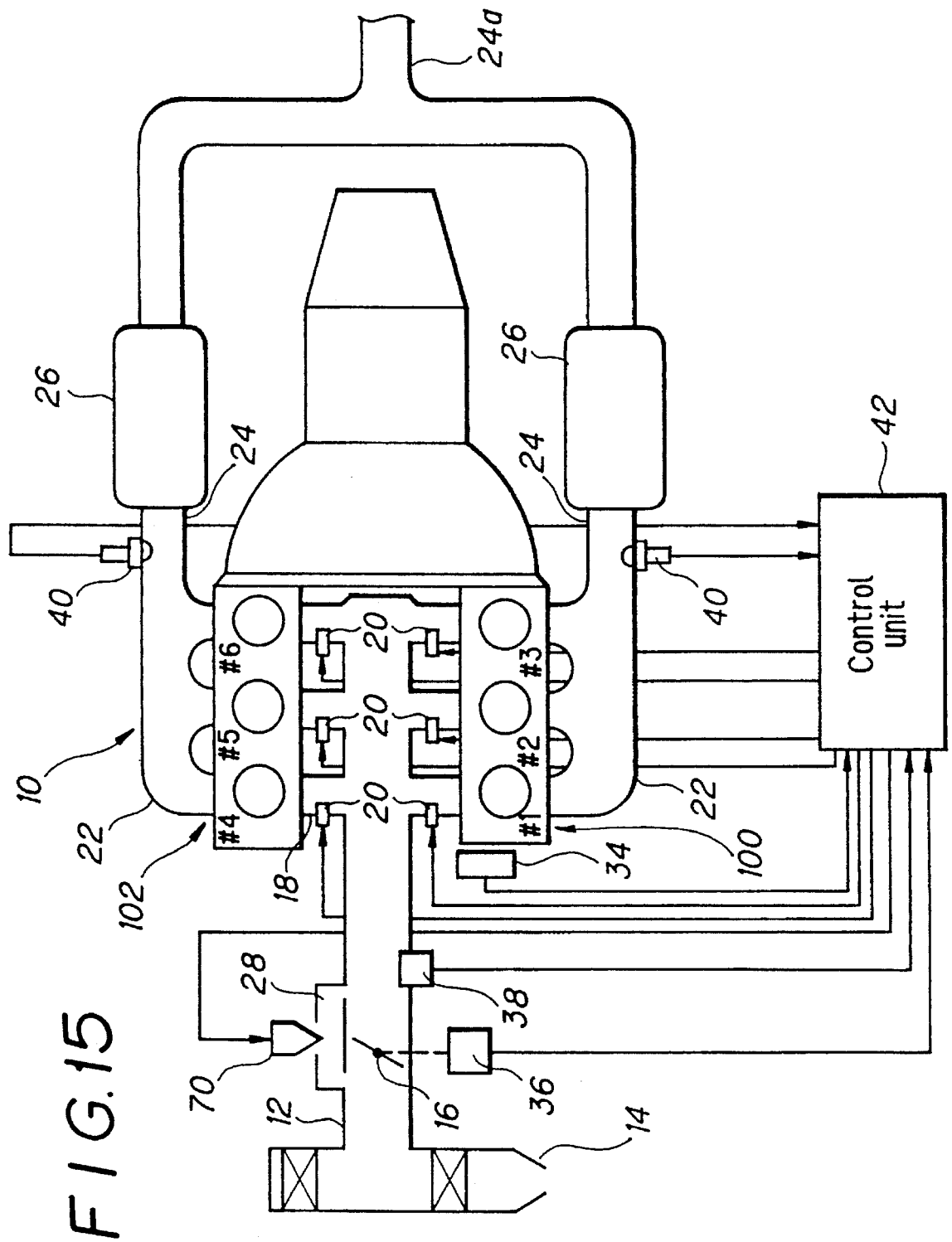
FIG. 15 is an explanatory view, partially similar to FIG. 1, but showing a second embodiment of the air/fuel ratio estimation system according to the invention.

FIG. 15 shows a second embodiment of the invention.

While the first embodiment relates to a four-cylinder internal combustion engine, the second embodiment relates to a V-type six-cylinder engine. Specifically, the engine 10 disclosed therein has two three-cylinder banks 100, 102. The exhaust manifold 22 is connected with the exhaust pipe 24 at the individual banks 100, 102, which are merged into one pipe 24a downstream. The LAF sensor 40 is provided at the confluence point at each bank 100 or 102. In the V-type engine disclosed, the firing order is determined as #1 (bank 100), #4 (bank 102), #2 (bank 100), #5 (bank 102), #3 (bank 100), #6 (bank 102).

In the second embodiment, similarly to the first embodiment, the weighting coefficients of the most recent m cylinders in the firing (combustion or exhaust) order at the individual banks 100, 102 are set to zero. To be more specific, m is determined to be 2 and if the cylinder currently in the exhaust stroke is #3 at the bank 100, the weighting coefficients of the cylinder #1 is made zero. Calculation is therefore conducted only with regards to the two most recent fired cylinders #3 and #2. Explaining this at the other bank 102, if the cylinder currently fired is #4, the coefficient of the cylinder #5 is set to zero.

Figure 16:
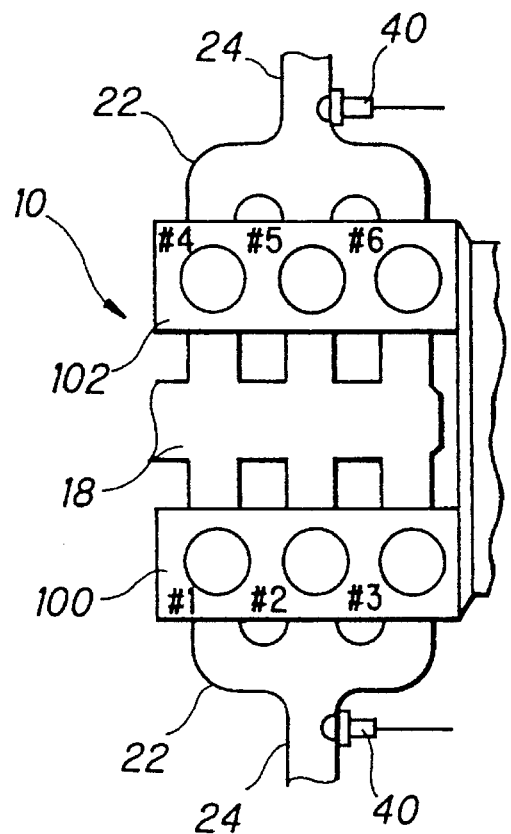
FIG. 16 is an explanatory view, similar to FIG. 15, but showing a modification of the second embodiment.
Figure 17:
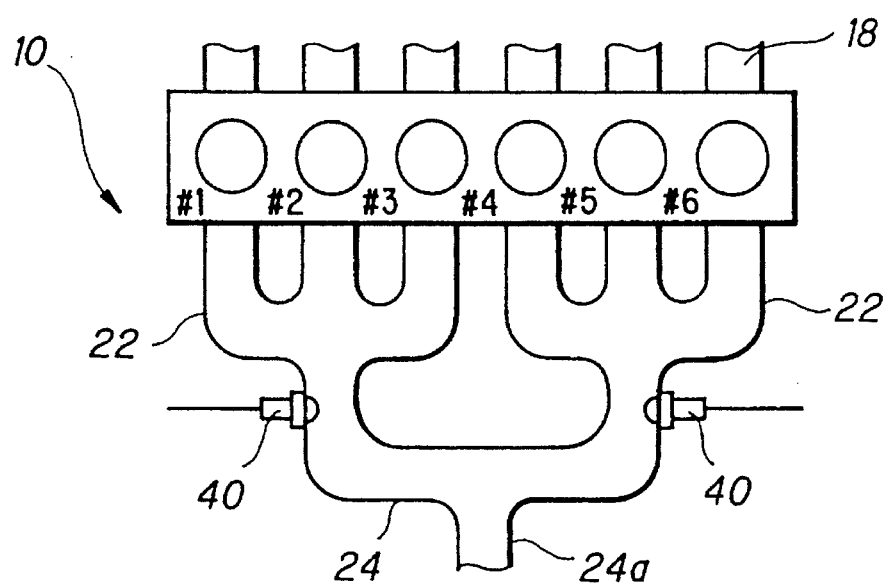
FIG. 17 is an explanatory view, similar to FIG. 15, but showing another modification of the second embodiment.

FIGS. 16 and 17 show other designs of a six-cylinder engines. It will be apparent from the foregoing description that for the respective LAF sensor outputs it is sufficient to calculate weighting coefficients only for the most recent m (=2) cylinders to fire.

Moreover, it will also be apparent from the foregoing description that the same principle can similarly be applied to a five-cylinder engine or an engine having eight or more cylinders. It is anticipated that in such cases it will also be sufficient to calculate weighting coefficients only for the most recent m cylinders to fire. Application to internal combustion engines with a larger number of cylinders may require an increase in the number m of cylinders for which weighting coefficients are calculated.

A third embodiment of the invention will now be explained with reference to FIG. 18.

The observer matrix is shown by Eq. 14. While the value A−KC is shown as a 4×4 matrix, the weighting coefficients C therein vary with changes in the engine operating condition. One possible approach to the matrix values would be to find solutions in advance over the anticipated range of variation in engine speed and engine load and to prepare them as mapped data. This is not practical, however, because obtaining a solution through interpolation which has no corresponding mapped value is not preferable, since the thus interpolated value has not been proved its correctness as the matrix value. Since Eq. 14 is a recursion formula, moreover, the calculation has to be redone if the coefficients change partway through.

Figure 18:
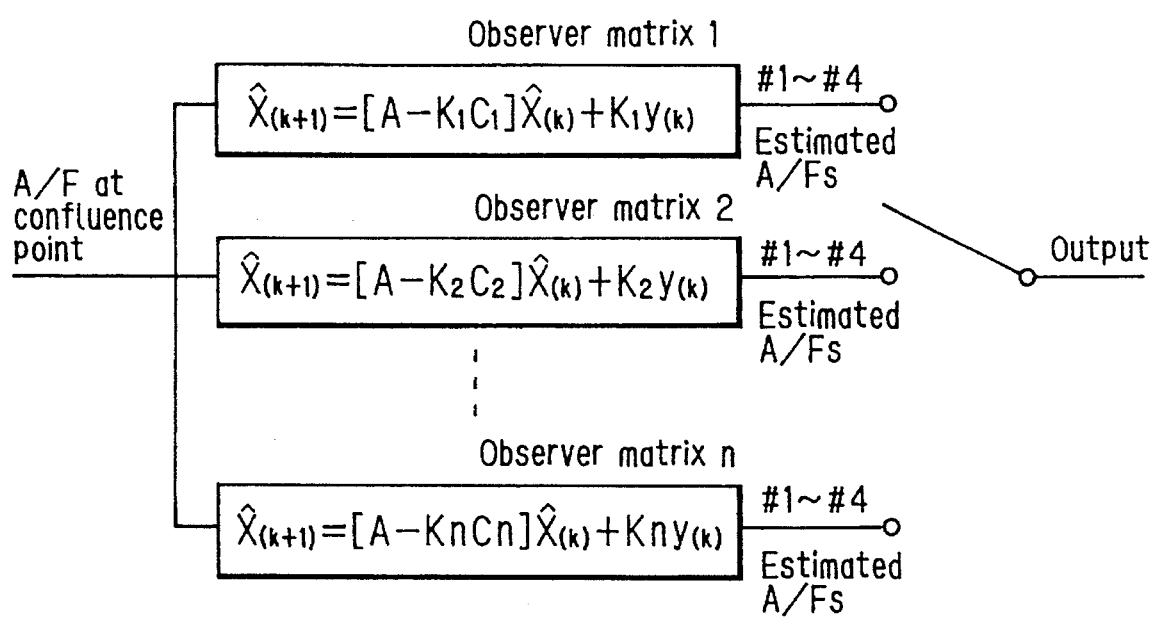
FIG. 18 is an explanatory view showing a third embodiment of the air/fuel ratio estimation system according to the invention.

In the third embodiment, therefore, as shown in FIG. 18, a plurality of observer matrices 1 to n prepared in advance are calculated in parallel and the matrix value matching the engine operating condition is selected. This enables the calculation time to be shortened and improves the accuracy at which the observer estimates the air/fuel ratios in the individual cylinders. Any number of observer matrices greater than one suffices. Moreover, instead of calculating all of the observer matrices at the same time, it is possible to predict changes in the engine operating condition and calculate only the observer matrices related to the predicted operating condition.

In the design of the observer of the earlier application, the ratio of the weight matrices Q and R were defined as Q/R=1/1. While this evaluation function greatly affects observer performance, it was later found through repeated validation by simulation that the convergence time decreases with increasing Q/R value up to a certain point, after which it remains almost unchanged. When, in light of this, the limit was set at Q/R≧100, good estimation results were obtained. Contrary to what one might expect, the fact that the evaluation function is a dimensionless number and can be assigned any value makes it harder, not easier, to decide. Through repeated validation, however, it was found that the estimation accuracy improved when the value of Q/R was 100 or higher.

Figure 19:
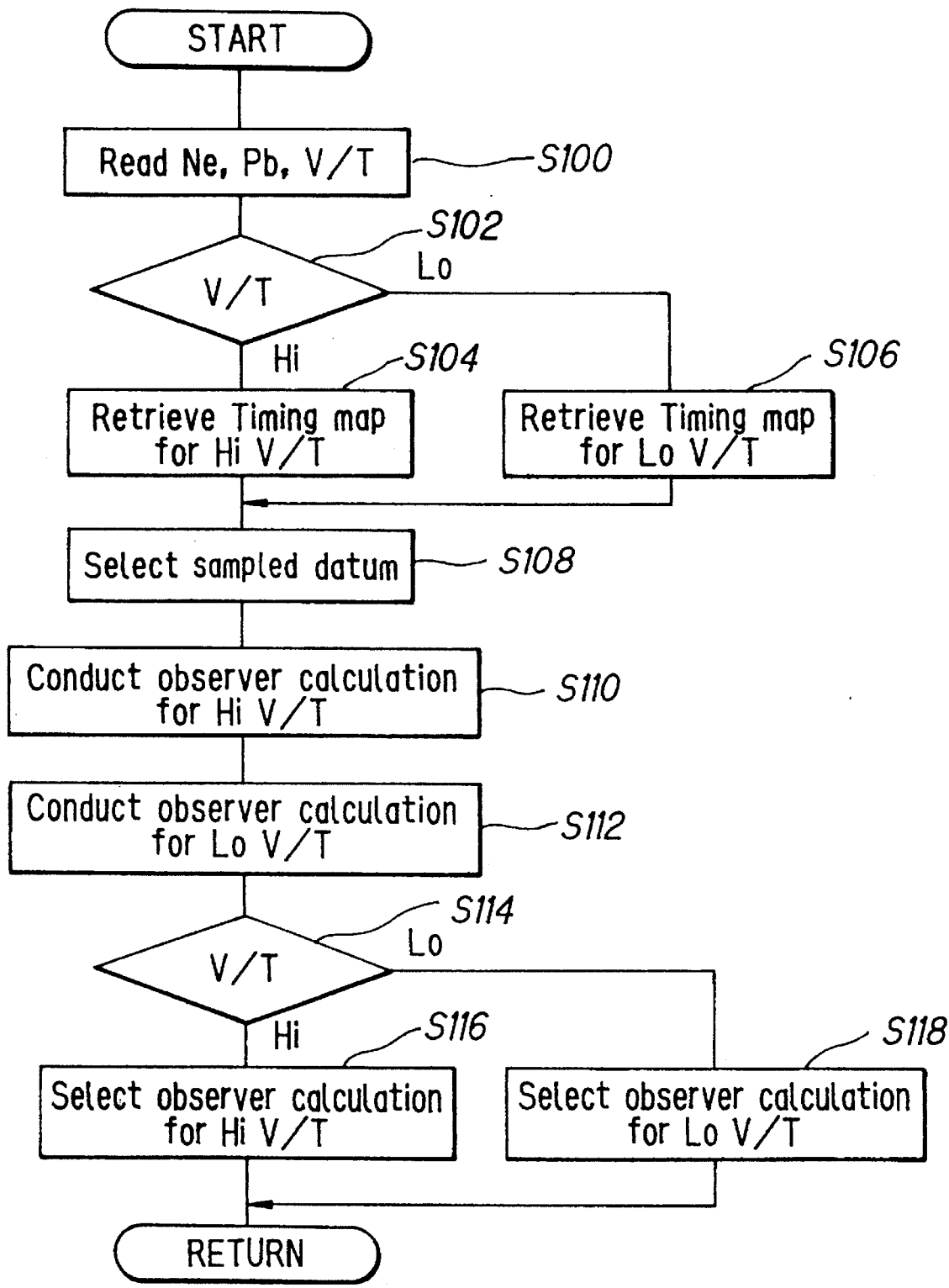
FIG. 19 is a flowchart which shows the operation of a fourth embodiment of the air/fuel ratio estimation system according to the invention.

FIG. 19 is a flowchart showing a fourth embodiment of the invention. The fourth embodiment is intended for application in estimating the air/fuel ratio of an internal combustion engine equipped with a variable valve timing mechanism.

Figure 20:
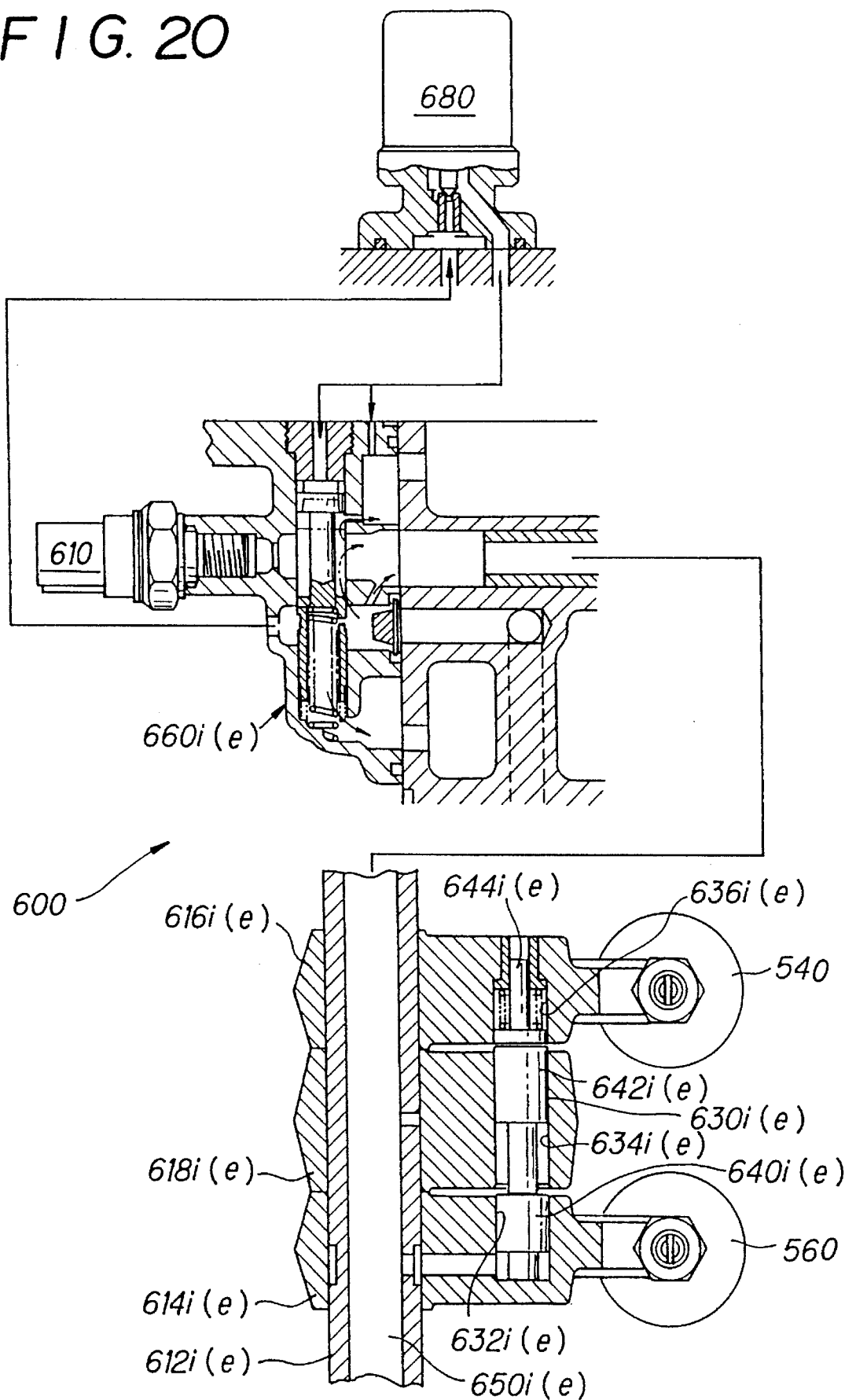
FIG. 20 is an explanatory view of a variable valve timing mechanism used in an internal combustion engine of the fourth embodiment.

The variable valve timing mechanism will be explained briefly with reference to FIGS. 20 and 21.

In the illustrated example, the variable valve timing mechanism, assigned generally with reference numeral 600, has three rocker arms 614, 616, 618 rotatably mounted on a rocker shaft 612 respectively provided in the vicinity of an intake valve 540 and an exhaust valve 560. (Since the configuration is the same as in the intake side and the exhaust side, numerals are provided with a suffix "i" or "e" and the explanation will be made without using the suffix.) The rocker arms are in contact with two cams for low speed (not shown) and one cam for high speed (not shown) whose profile projects outwardly than that of the low speed cams. The cams are mounted on a cam shaft (not shown). The rocker arms 614, 616, 618 have an engaging mechanism 630 comprising of an oil passage 650, a recess 632 and holes 634, 636 and pins 640, 642 and 644. A switching mechanism 660 is interposed between an oil power source (not shown) and the oil passage 650 and supplies/cuts oil to the passage through an electromagnetic valve 680 in order to move the pins forward or reward to engage/disengage the rocker arms. The valve timing and the amount of valve lifting are determined by the high speed cam when the rocker arms are engaged and are determined by the low speed cams when the rocker arms are disengaged. Since the structure and operation of the variable valve timing mechanism is known in the art, no further explanation is made.

Figure 21:
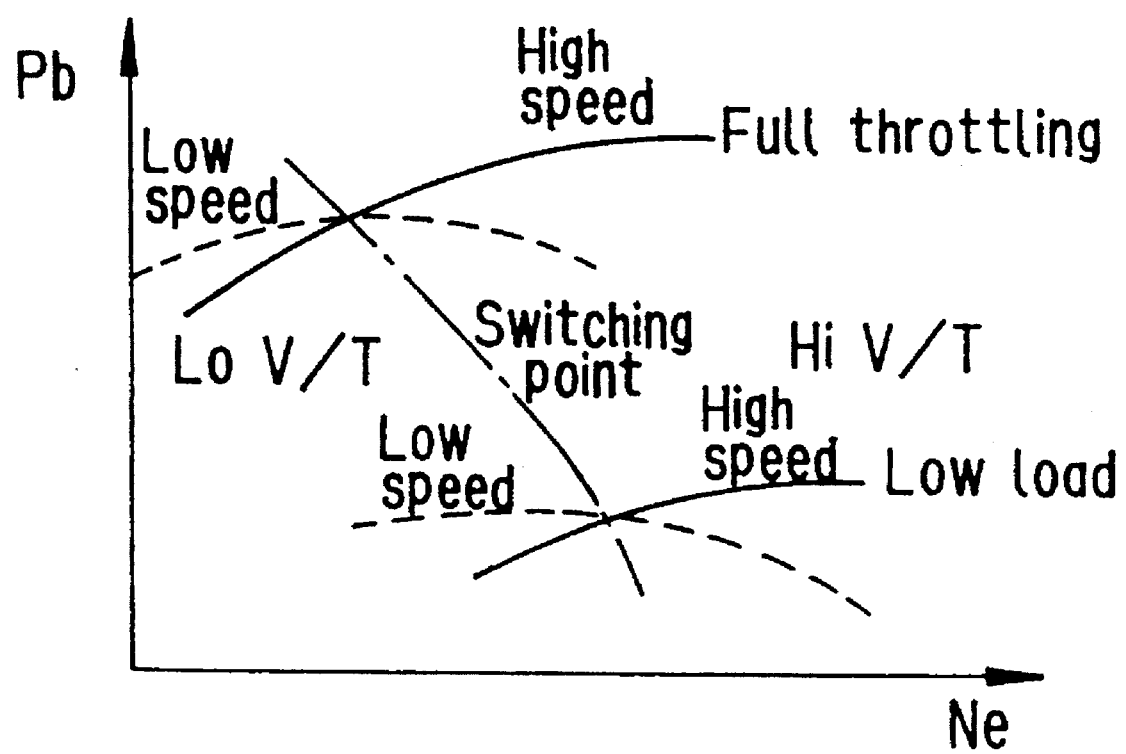
FIG. 21 is an explanatory view of the switching characteristics of the valve timing in the variable valve timing mechanism illustrated in FIG. 20.

The engagement/disengagement of the rocker arms is determined on the basis of the engine speed Ne and manifold absolute pressure Pb as illustrated in FIG. 21. When the high speed cam operates (this hereinafter referred to as "Hi V/T"), the valve timing is advanced than the case when the low speed cams operate (this hereinafter referred to as "Lo V/T") so that the amount of overlapping of valve timing and the amount of valve lifting are increased. The switching mechanism 660 has a valve timing sensor 610 made up of such as an oil pressure switch which detects through the oil pressure in the passage 650 whether the valve timing is controlled at Hi V/T or Lo V/T. The output of the valve timing sensor 610 is sent to the control unit as illustrated by the phantom line box in FIG. 2.

For ascertaining the time-course behavior of the confluence point air/fuel ratio, it is necessary to optimize the sampling timing of the air/fuel ratio in the observer computation for determining the air/fuel ratios in the individual cylinders. This requirement arises despite the fact that the characteristic exhibited by the LAF sensor output is clearly synchronized with the engine speed, because the control unit uses digital sampling and may not be able to ascertain the behavior if the sampling timing is not optimized. The valve timing is considered to have a pronounced effect on the optimum sampling timing. Therefore, in the fourth embodiment of the invention, which is intended for use in association with an internal combustion engine equipped with the variable valve timing mechanism, the sampling timing is decided based on the engine speed, engine load and valve timing.

Since the behavior of the confluence point air/fuel ratio also varies with the valve timing, the observer matrix has to be changed synchronously with switching of the valve timing. However, the estimation of the air/fuel ratios in the individual cylinders is not conducted instantaneously. Since several cycles are required for the observer computation to converge, the computations using the observer matrices before and after valve timing switchover are conducted simultaneously and the estimated air/fuel ratios in the individual cylinders are updated after it is judged that the observer computations have converged, namely after the valve timing change operation.

Figure 22:
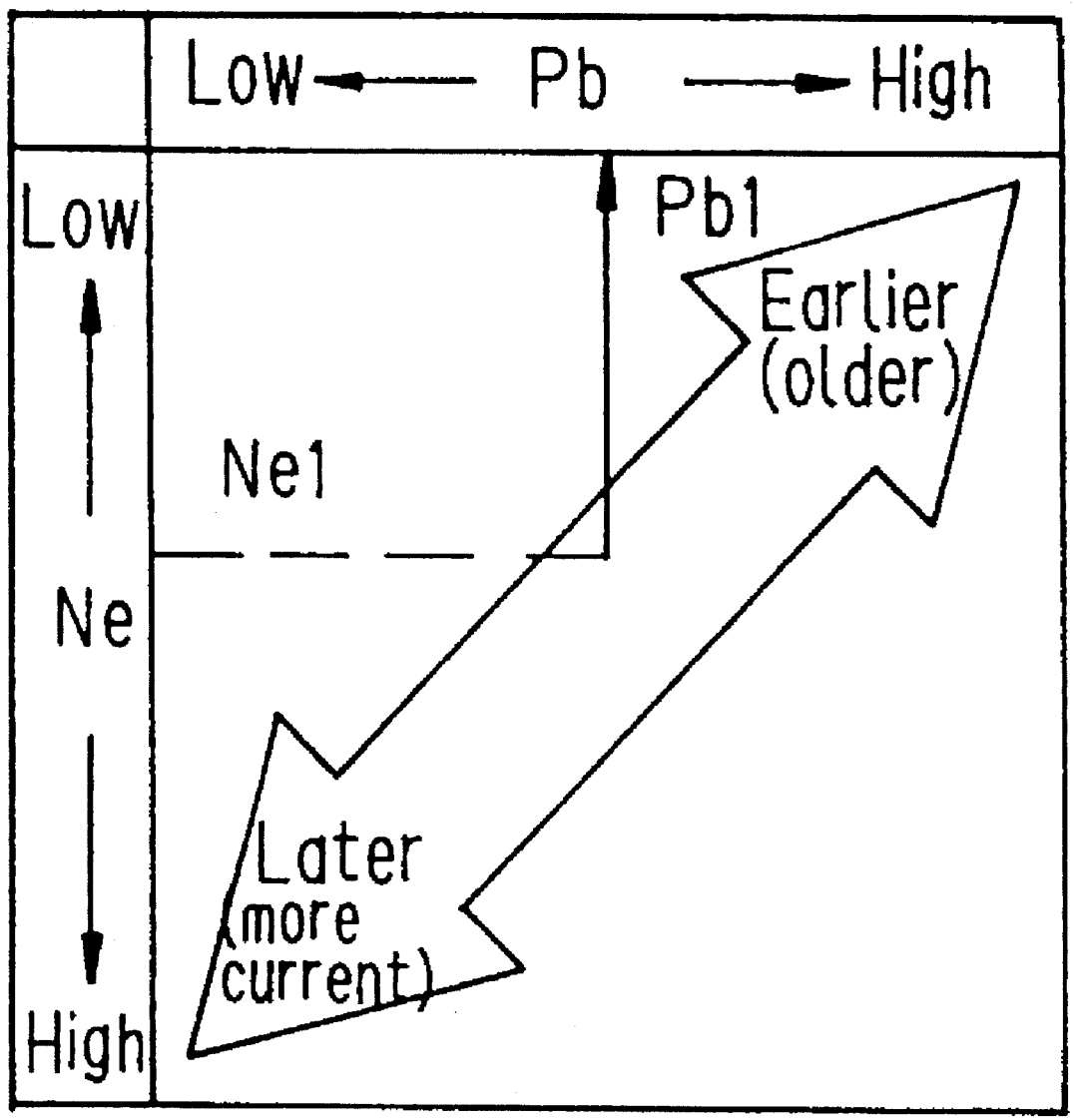
FIG. 22 is an explanatory view of the characteristics of sampling timing of the air/fuel ratio sensor referred to in the flowchart of FIG. 19.

In the flowchart of FIG. 19, the engine speed Ne, manifold absolute pressure Pb and the valve timing V/T are first read in S100. A discrimination is then made in S102 as to whether the valve timing is Hi V/T or Lo V/T. In the case of Hi V/T, a sampling timing map for Hi V/T is looked up in S104, while in the case of Lo V/T a sampling timing map for Lo V/T is looked up in S106. FIG. 22 shows the characteristics of these maps.

That is; sampling is preferably conducted near the position of the actual inflection point of the LAF sensor output. If the sensor response time is constant, the inflection point (peak value) will occur at earlier crank angles with decreasing engine speed. As engine load increases, on the other hand, the exhaust gas can be expected to increase in pressure and volume and therefore reach the sensor earlier owing to its higher flow rate. The maps are therefore prepared so that the sampling crank angle becomes earlier with decreasing engine speed and increasing manifold absolute pressure Pb. By the word "earlier" is meant a relatively older one sampled nearer to the preceding TDC.

The relationship between the sampling timing and the valve timing will then be discussed. Defining an arbitrary engine speed value Ne as Ne1–Lo on the Lo V/T side and Ne1–Hi on the Hi V/T side and an arbitrary manifold absolute pressure value Pb1 as Pb1–Lo on the Lo V/T side and Pb1–Hi on the Hi V/T side, the values are mapped such that $$Pb1\text{--}Lo > Pb1\text{--}Hi$$

$$Ne1\text{--}Lo > Ne1\text{--}Hi.$$

In other words, since the time point at which the exhaust valve opens is earlier at Hi V/T than at Lo V/T, an earlier sampling point is selected at Hi V/T than at Lo V/T insofar as the engine speed and manifold absolute pressure are the same.

Next, in S108, the LAF sensor output is sampled at the sampling point retrieved from the map, specifically one among sampled data is selected in accordance with the sampling timing retrieved from the map. Then, based on the sampled value, the observer matrix of Eq. 14 is first computed for Hi V/T in S110 and then for Lo V/T in S112, whereafter the valve timing is discriminated again in S114 and, depending on the result of the discrimination, the observer matrix calculation is changed, i.e. the computation result for Hi V/T is selected in S116 or that for Lo V/T is selected in S118. This completes the routine. The computed result is used for feedback control of the air/fuel ratios in the individual cylinders in the manner explained earlier with respect to FIG. 13.

Since the fourth embodiment is configured to sample the air/fuel ratio sensor output in the light of the engine speed, manifold absolute pressure and valve timing, it achieves improved detection accuracy. Moreover, since the observer matrix is switched in response to changes in valve timing, moreover, the air/fuel ratios in the individual cylinders can be estimated with higher accuracy.

Figure 23:
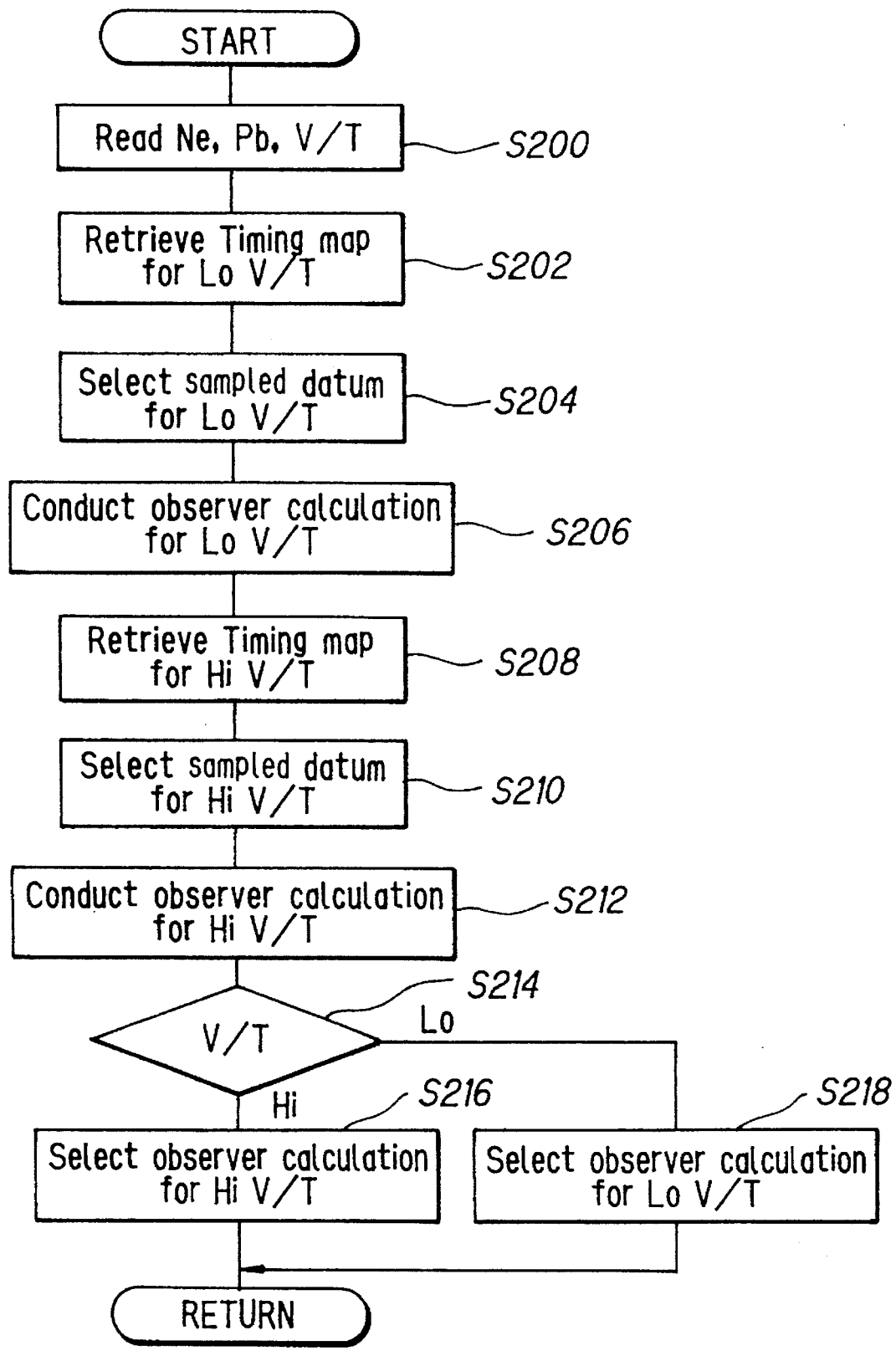
FIG. 23 is a flowchart, similar to FIG. 19, but showing a fifth embodiment of the air/fuel ratio estimation system according to the invention.

FIG. 23 is a flowchart similar to that of FIG. 19 showing a fifth embodiment of the invention.

The fifth embodiment is a modification of the fourth embodiment. The engine speed and the like are read in S200, the map for Lo V/T timing is looked up in S202, the LAF sensor output is sampled for Lo V/T, i.e., one among the sampled data is selected for Lo V/T in S204, and the observer matrix computation for Lo V/T is conducted in S206. Following this, similar processing is conducted for the Hi V/T side in S208 to S212. The valve timing is then discriminated in S214, whereafter one of the computation results is selected in S216 or S218 on the basis of the discrimination results. Thus differently from in the third embodiment which samples either for the Lo V/T or the high Hi V/T and uses it for both observer computations, the fifth embodiment conducts the computations using separate sampling values for Lo V/T and Hi V/T. The rest of the configuration is the same as that of the fourth embodiment.

While the fourth and fifth embodiments have been explained with respect to a variable valve timing mechanism which varies the timing of both the intake valve and the exhaust valve, they can also be applied to an internal combustion engine equipped with a variable valve timing mechanism that varies the timing of only one of the intake or exhaust valves or a variable valve timing mechanism which rests one of the intake valves when two or more intake valves are provided. In addition, the valve timing detection means is not limited to a hydraulic switch. It is instead possible to detect the valve timing by sensing the positions of the pins 640, 642, 644 or by deriving information regarding the valve timing from the valve timing switching command signal produced by the control unit of the variable valve timing mechanism.

The first to fifth embodiments have been explained with respect to examples in which a model describing the behavior of the exhaust system is designed and air/fuel ratio control is conducted using an observer which observes the internal state of the model. The invention is not limited to this method of air/fuel ratio detection, however, but can be applied to any control technology which regulates air/fuel ratio based on values measured by an air/fuel ratio sensor.

It is further possible to increase the number of parameters used for detecting the engine operating condition beyond the engine speed and the manifold absolute pressure mentioned in the foregoing description. Moreover, the engine load can be detected using a parameter other than the manifold absolute pressure, such as the intake air mass flow or degree of throttle opening. It is also possible to correct the detected engine load for atmospheric pressure.

Although the foregoing embodiments have been explained with respect to examples in which the actual air/fuel ratio is derived by analyzing the response delay of a wide-range air/fuel ratio sensor and the air/fuel ratios in the individual cylinders are obtained based thereon from the output of a single sensor at the confluence point, the system for estimating air/fuel ratios in the individual cylinders of an internal combustion engine according to this invention is not limited to this arrangement and can instead be configured to have air/fuel ratio sensors disposed in the exhaust system in a number equal to the number of cylinders and to use their outputs for measuring the air/fuel ratios in the individual cylinders.

Moreover, while the invention has been explained with respect to the embodiments using a widerange air/fuel ratio sensor as the air/fuel ratio sensor, the invention can also be partly applied to the case in which an $O_2$ sensor is used.

The present invention has thus been shown and described with reference to specific embodiments. However, it should be noted that the present invention is in no way limited to the details of the described arrangements and that changes and modifications can be made without departing from the scope of the appended claims.

What is claimed is:

1. A system for controlling air/fuel ratios of individual cylinders of a multicylinder internal combustion engine connected to an exhaust pipe via an exhaust manifold that constitutes an exhaust system of the engine, said system having:

an air/fuel ratio sensor installed at the exhaust system of the engine;

detection circuit for receiving an output of said air/fuel ratio sensor to determine an air/fuel ratio at a confluence point of the exhaust system;

modeling means for modeling a behavior of the exhaust system by an equation established based on an assumption that the air/fuel ratio at the confluence point is expressed as a sum of products of past firing histories of the individual cylinders and a weighting coefficient C each indicative of contribution thereto of the individual cylinders;

estimating means for estimating the air/fuel ratios in the individual cylinders from the equation;

fuel injection quantity determining means for determining a fuel injection quantity to be supplied to the engine at least based on a base value and the estimated air/fuel ratios of the individual cylinders; and a fuel injector for injecting fuel based on the determined fuel injection quantity;

wherein the improvement comprises:

zero setting means for setting the weighting coefficient C to zero for a cylinder other than most recent m ($2 \leq m < n$) cylinders when a number of cylinders to be estimated their air/fuel ratios is $3 \leq n$.

2. A system according to claim 1, wherein the multicylinder internal combustion engine is a four-cylinder engine and the number n=4.

3. A system according to claim 2, wherein the number m=2.

4. A system according to claim 1, wherein the multicylinder internal combustion engine is a six-cylinder engine with two-cylinder banks each having the air/fuel ratio sensor and the number n=3.

5. A system according to claim 4, wherein the number m=2.

6. A system according to claim 1, wherein the number m=2.

7. A system for controlling air/fuel ratios of individual cylinders of a multicylinder internal combustion engine connected to an exhaust pipe via an exhaust manifold that constitutes an exhaust system of the engine, said system having;

an air/fuel ratio sensor installed at the exhaust system of the engine;

a detection circuit for receiving an output of said air/fuel ratio sensor to determine an air/fuel ratio at a confluence point of the exhaust system;

modeling means for modeling a behavior of the exhaust system by an equation established based on an assumption that the air/fuel ratio at the confluence point is expressed as a sum of products of past firing histories of the individual cylinders and weighting coefficients thereof;

observer establishing for establishing an observer to obtain a state variable that indicates the air/fuel ratios of the individual cylinders estimating means for estimating the air/fuel ratios in the individual cylinders from the equation;

fuel injection quantity determining means for determining a fuel injection quantity to be supplied to the engine at least based on a base value and the estimated air/fuel ratios of the individual cylinders; and a fuel injector for injecting fuel based on the determined fuel injection quantity;

wherein the improvement comprises:

engine operating condition detecting means for detecting the operating condition of the engine; and said observing establishing a plurality of observer matrices with respect to the operating condition of the engine and selecting one from among the observer matrices in response to the detected operating condition of the engine.

8. A system according to claim 7, wherein said observer establishing establishes a plurality of the observer matrices in advance, conducts matrix calculation for the observers at the same time and selects one from among results of the matrix calculation in response to the detected operating condition of the engine.

9. A system according to claim 8, wherein the engine operating condition is determined by an engine speed and an engine load.

10. A system according to claim 7, wherein the engine operating condition is determined by an engine speed and an engine load.

11. A system for controlling air/fuel ratios of individual cylinders of a multicylinder internal combustion engine connected to an exhaust pipe via an exhaust manifold that constitutes an exhaust system of the engine, said system having:

an air/fuel ratio sensor installed at the exhaust system of the engine;

a detection circuit for receiving an output of said air/fuel ratio sensor to determine an air/fuel ratio at a confluence point of the exhaust system;

modeling means for modeling a behavior of the exhaust system by an equation established based on an assumption that the air/fuel ratio at the confluence point is expressed as a sum of products of past firing histories of the individual cylinders an weighting coefficients thereof;

observer establishing for establishing an observer to obtain a state variable that indicates the air/fuel ratios in the individual cylinders estimating means for estimating the air/fuel ratios in the individual cylinders from the equation;

fuel injection quantity determining means for determining a fuel injection quantity to be supplied to the engine at least based on a base value and the estimated air/fuel ratios of the individual cylinders; and a fuel injector for injecting fuel based on the determined fuel injection quantity;

wherein the improvement comprises:
a variable valve timing mechanism which switches at least one of a valve timing and a valve lifting between a plurality of valve timing characteristics;

valve timing detecting means for detecting the valve timing characteristic switched by said variable valve timing mechanism; and said observer establishing changing observer matrix in response to the detected valve timing characteristic.

12. A system according to claim 11, wherein said observer establishing establishes a plurality of observer matrices with respect to the valve timing characteristics, conducts matrix calculation at the same time and selects one from among results of the matrix calculation in response to the detected valve timing characteristic.

13. A system according to claim 11, wherein said modeling means samples the output of said air/fuel ratio sensor at least in response to the detected valve timing characteristic.

14. A system according to claim 13, wherein said observer establishing establishes a plurality of observer matrices with respect to the valve timing characteristics, conducts matrix calculation at the same time using the output of said air/fuel ratio sensor sampled by said modeling means, and selects one from among results of the matrix calculation in response to the detected valve timing characteristic.

15. A system according to claim 11, wherein said modeling means samples the output of said air/fuel ratio sensor with respect to the valve timing characteristics respectively, conducts matrix calculation at the same time using the outputs of said air/fuel ratio sensor respectively sampled by said modeling means, and selects one from among results of the matrix calculation in response to the detected valve timing characteristic.

16. A system for controlling air-fuel ratios of individual cylinder of a multi-cylinder internal combustion engine connected to an exhaust pipe via an exhaust manifold constituting an exhaust system of the engine, said system comprising:

an air/fuel ratio sensor installed at the exhaust system of the engine;

a fuel injector for injecting fuel into the internal combustion engine;

a controller for controlling the fuel injector, said controller being configured to receive an output of said air/fuel ratio sensor, and determine an air/fuel ratio at a confluence point of the exhaust system;

model a behavior of the exhaust system by an equation established based on a principle that the air/fuel ratio at the confluence point is expressed as a sum of products of past firing histories of the individual cylinders and a weighting coefficient C, each indicative of a contribution thereto of the individual cylinders;

setting the weighting coefficient C to 0 for a cylinder other than the most recent m ($2 \geq m > n$) cylinders when a number of cylinders to have their air/fuel ratios estimated is $3 \geq n$;

estimate the air/fuel ratios in the individual cylinders from the equation;

determine a fuel injection quantity to be supplied to the engine by the fuel injection quantity to be supplied to the engine by the fuel injector at least based on a base value and the estimated air/fuel ratios of the individual cylinders; and controlling said fuel injector to inject fuel based upon the determined fuel injection quantity.

17. A system according to claim 16, wherein the multi-cylinder internal combustion engine is a four-cylinder engine and the number n=4.

18. A system according to claim 17, wherein the number m=2.

19. A system according to claim 16, wherein the multi-cylinder internal combustion engine is a six-cylinder engine with two-cylinder banks each having the air/fuel ratio sensor and the number n=3.

20. A system according to claim 19, wherein the number m=2.

21. A system according to claim 16, wherein the number m=2.

22. A system for controlling air/fuel ratios of individual cylinders of a multicylinder internal combustion engine connected to an exhaust pipe via an exhaust manifold, said exhaust pipe and exhaust manifold constituting an exhaust system of the engine, said system comprising:

an air/fuel ratio sensor installed at the exhaust system of the engine;

a fuel injector for injecting fuel into said engine;

a microprocessor connected to said air/fuel ratio sensor and said fuel injector, said microprocessor controlling the air/fuel ratios of the individual cylinders, and configured to receive an output of the air/fuel ratio sensor and to determine an air/fuel ratio at a confluence point of the exhaust system;

model a behavior of the exhaust system by an equation established based on a theory that the air/fuel ratio at the confluence point is expressed as a sum of products of past firing histories of the individual cylinders and weighting coefficients thereof;

detect an operating condition of the engine based on operating information input thereto;

establish an observer to obtain a state variable which indicates the air/fuel ratios of the individual cylinders, and establish a plurality of observer matrices with respect to the operating condition of the engine, and to select one from among the observer matrices in response to the detected operating condition of the engine;

estimate the air/fuel ratios in the individual cylinders from the equation;

determine a fuel injection quantity to be supplied to the engine at least based on a base value and the estimated air/fuel ratios in the individual cylinders; and control the fuel injector to inject fuel based upon the determined fuel injection quantity.

23. A system according to claim 22, wherein said microprocessor is further configured to pre-establish a plurality of observer matrices, conduct matrix calculation for the observer matrices simultaneously, and select one result from among a plurality of calculation results in response to the detected operating condition of the engine.

24. A system according to claim 23, wherein the microprocessor detects the engine operating condition based upon engine speed and engine load.

25. A system according to claim 22, wherein the microprocessor detects the engine operating condition based upon engine speed and engine load.

26. A system for controlling air/fuel ratios of individual cylinders of a multicylinder internal combustion engine connected to an exhaust pipe via an exhaust manifold, thereby constituting an exhaust system of the engine, said system comprising:

an air/fuel ratio sensor installed at the an exhaust system of the engine;

a variable valve timing mechanism which switches at least one of a valve timing and a valve lifting between a plurality of valve timing characteristics;

a fuel injector for injecting fuel into said internal combustion engine;

a microprocessor connected to said air/fuel ratio sensor and said fuel injector, said microprocessor configured to receive an output of said air/fuel ratio sensor and to determine an air/fuel ratio at a confluence point of the exhaust system;

model a behavior of the exhaust system by an equation established upon a theory that the air/fuel ratio at the confluence point is expressed as a sum of products of past firing histories of the individual cylinders and weighting coefficients thereof;

detect the valve timing characteristic switched by said variable valve timing mechanism;

establish an observer to obtain a state variable that indicates the air/fuel ratios in the individual cylinders, said observer changing an observer matrix in response to the detected valve timing characteristic;

estimating the air/fuel ratios in the individual cylinders from the equation;

determining a fuel injection quantity to be supplied to the engine at least upon a base value and the estimated air/fuel ratios of the individual cylinders; and controlling the fuel injector to inject fuel based upon the determined fuel injection quantity.

27. A system according to claim 26, wherein said microprocessor is further configured to establish a plurality of observer matrices with respect to the valve timing characteristics, conduct matrix calculation simultaneously, and select one result from among results of the matrix calculations in response to the detected valve timing characteristic.

28. A system according to claim 26, wherein said microprocessor is further configured to sample the output of the air/fuel ratio sensor at least in response to the detected valve timing characteristic.

29. A system according to claim 28, wherein said microprocessor is further configured to establish a plurality of observer matrices with respect to the valve timing characteristics, conduct matrix calculation simultaneously using the output of said air/fuel ratio sensor sampled by said microprocessor as part of said modeling step, and to select one result from among results of the matrix calculations in response to the detected valve timing characteristic.

30. A system according to claim 26, wherein said microprocessor is further configured to sample the output of the air/fuel ratio sensor with respect to the valve timing characteristics, to conduct matrix calculation simultaneously using the outputs of the air/fuel ratio sensor respectively sampled, and to select one result from among results of the matrix calculations in response to the detected valve timing characteristic.

* * * * *